United States Patent

Yi et al.

(10) Patent No.: US 10,868,334 B2
(45) Date of Patent: Dec. 15, 2020

(54) ELECTROLYTE AND ELECTROCHEMICAL DEVICE

(71) Applicant: Contemporary Amperex Technology Co., Limited, Ningde (CN)

(72) Inventors: Tiancheng Yi, Ningde (CN); Chunhua Hu, Ningde (CN); Zijun Xu, Ningde (CN); Lu Miao, Ningde (CN); Chengdu Liang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 11 days.

(21) Appl. No.: 16/355,639

(22) Filed: Mar. 15, 2019

(65) Prior Publication Data

US 2019/0326633 A1   Oct. 24, 2019

(30) Foreign Application Priority Data

Apr. 20, 2018  (CN) .......................... 2018 1 0360151

(51) Int. Cl.
  *H01M 10/0525*  (2010.01)
  *H01M 10/0567*  (2010.01)
  *H01M 10/0569*  (2010.01)

(52) U.S. Cl.
  CPC ... *H01M 10/0567* (2013.01); *H01M 10/0525* (2013.01); *H01M 10/0569* (2013.01); *H01M 2300/004* (2013.01)

(58) Field of Classification Search
  CPC ......... H01M 10/0567; H01M 10/0525; H01M 10/0569; H01M 10/0568; H01M 2300/004
  See application file for complete search history.

(56) References Cited

U.S. PATENT DOCUMENTS

2011/0045359 A1* 2/2011 Schmidt ................ C07C 311/48
                                                                        429/338
2015/0064578 A1* 3/2015 Kang ................... H01M 10/052
                                                                        429/341

(Continued)

FOREIGN PATENT DOCUMENTS

CN     104995784 A    10/2015
CN     105609874 A    5/2016

(Continued)

OTHER PUBLICATIONS

Supplemental material (Year: 2014).*

(Continued)

*Primary Examiner* — Alexander Usyatinsky
(74) *Attorney, Agent, or Firm* — Law Offices of Liaoteng Wang

(57) ABSTRACT

This application provides an electrolyte and an electrochemical device, in which the electrolyte comprises an additive A and an additive B, wherein the additive A is present in an amount of 0.001% to 10% by mass in the electrolyte and the additive B is present in an amount of 0.1% to 10% by mass in the electrolyte and the electrolyte has a conductivity of 4 mS/cm to 12 mS/cm at 25° C. The present invention can improve the cycle performance and storage performance of the electrochemical device, in particular, improve the cycle performance and storage performance of the electrochemical device under high temperature and high voltage conditions while keeping the low temperature performance.

17 Claims, 1 Drawing Sheet

(56) References Cited

U.S. PATENT DOCUMENTS

Figure 1:
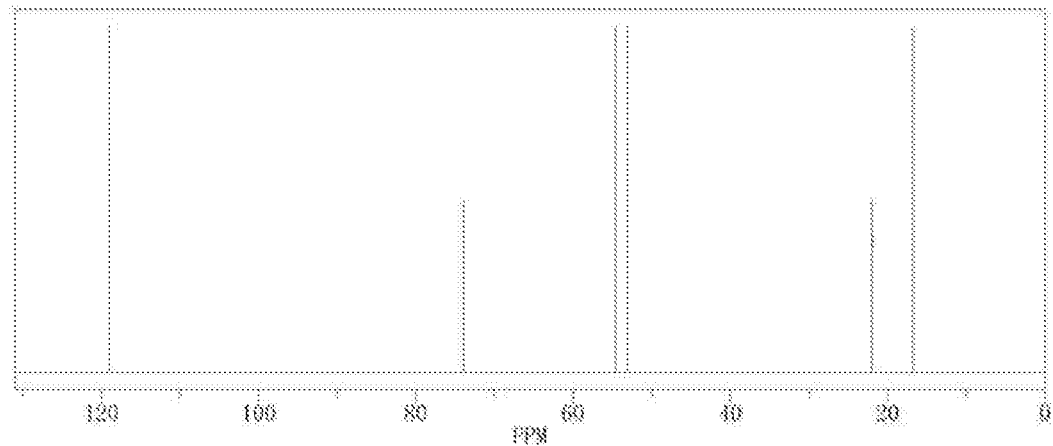

| | | | | |
|---|---|---|---|---|
| 2015/0152045 A1* | 6/2015 | Schmidt | ............... | C07D 207/08 |
| | | | | 429/338 |
| 2015/0364794 A1* | 12/2015 | Nakazawa | ........ | H01M 10/0567 |
| | | | | 429/200 |
| 2018/0013168 A1 | 1/2018 | Yu et al. | | |

FOREIGN PATENT DOCUMENTS

| | | | |
|---|---|---|---|
| JP | 2001357877 A | 12/2001 |
| JP | 2002025551 A | 1/2002 |
| JP | 2008159419 A | 7/2008 |
| JP | 2010044883 A | 2/2010 |

OTHER PUBLICATIONS

Supplementary Material 2.*
Extended European Search Report for European Application No. 19164143.0, dated May 9, 2019, 7 pages.
The Official Action and search report dated Mar. 10, 2020 for Japanese application No. 2019-053813, 3 pages.

* cited by examiner

ELECTROLYTE AND ELECTROCHEMICAL DEVICE

CROSS-REFERENCE TO RELATED APPLICATION

This application is based on and claims priority to Chinese Patent Application No. 201810360151.6 filed on Apr. 20, 2018, which is incorporated herein by reference in its entirety.

TECHNICAL FIELD

The present application relates to the field of energy storage materials, and in particular to an electrolyte and an electrochemical device.

BACKGROUND

Lithium-ion secondary batteries are widely used in electric vehicles and consumer electronics because of their high energy density, high output power, long cycle life and small environmental pollution. The current demand for lithium-ion secondary batteries is: high voltage, high power, long cycle life, long storage life and excellent safety performance.

Currently, the electrolyte system in which lithium hexafluorophosphate is used as a conductive lithium salt and a cyclic carbonate and/or a chain carbonate is used as an organic solvent is widely used for lithium-ion secondary batteries. However, the above electrolyte system still has many deficiencies. For example, under high voltage and high temperature conditions, the cycle performance and storage performance of the above electrolyte system need to be improved.

In view of this, the present application is specifically filed.

SUMMARY

In view of the problems in the prior art, the purpose of the present application is to provide an electrolyte and an electrochemical device, which can improve the cycle performance and storage performance of the electrochemical device, especially the cycle performance and storage performance of the electrochemical device under high temperature and high voltage conditions while also keeping the low temperature performance of the electrochemical device.

In order to achieve the above object, in a first aspect of the present application, the present application provides an electrolyte comprising an additive A and an additive B, wherein the additive A is present in an amount of 0.001% to 10% by mass in the electrolyte and the additive B is present in an amount of 0.1% to 10% by mass in the electrolyte and wherein the electrolyte has a conductivity of 4 mS/cm to 12 mS/cm at 25° C.

The additive A is selected from one or more of the compounds represented by Formula I-1, Formula I-2 and Formula I-3. In Formula I-1, Formula I-2, Formula I-3: $R_1$, $R_2$, $R_3$, $R_4$ are each independently selected from a hydrogen atom, a halogen atom, a substituted or unsubstituted $C_1$-$C_{12}$ alkyl group, a substituted or unsubstituted $C_1$-$C_{12}$ alkoxy group, a substituted or unsubstituted $C_1$-$C_{12}$ amino group, a substituted or unsubstituted $C_2$-$C_{12}$ alkenyl group, a substituted or unsubstituted $C_2$-$C_{12}$ alkynyl group, a substituted or unsubstituted $C_6$-$C_{26}$ aryl group, or a substituted or unsubstituted $C_2$-$C_{12}$ heterocyclic group, wherein the substituent is selected from one or more of a halogen atom, a cyano group, a $C_1$-$C_6$ alkyl group, a $C_2$-$C_6$ alkenyl group, and a $C_1$-$C_6$ alkoxy group; wherein x, y, and z are each independently selected from an integer of 0 to 8; m, n, and k are each independently selected from an integer of 0 to 2.

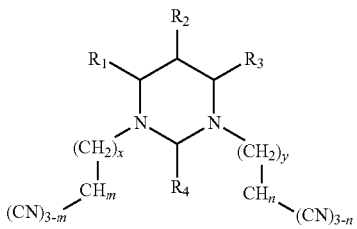

Formula I-1

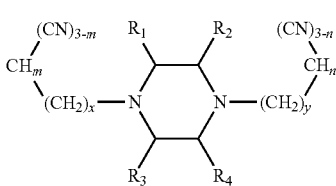

Formula I-2

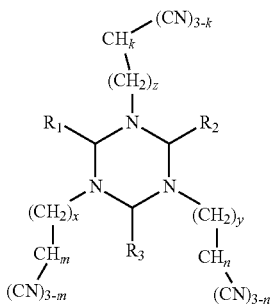

Formula I-3

The additive B is selected from a lithium sulfonimide salt represented by formula II. In the formula II, $R_F$ is one of $C_{p1}F_{2p1+1}$ and $F(CF_2CF_2O)_{q1}CF_2CF_2$, p1 and p2 are each independently selected from an integer of 0 to 8; and q1 and q2 are each independently selected from an integer of 1 to 6.

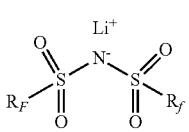

Formula II

In a second aspect of the present application, the present application provides an electrochemical device comprising a positive electrode plate, a negative electrode plate, a separator disposed between the positive electrode plate and the negative electrode plate, and the electrolyte according to the first aspect of the present application.

The technical solution of the present application has at least the following beneficial effects:

By adding a nitrogen-containing six-membered heterocyclic compound with more than one cyano group and a lithium sulfonimide salt as an additive in the electrolyte of the present application, the surface of positive active materials can be effectively passivated, the surface activity of positive active materials can be suppressed, the oxidation effect of the positive active materials on the electrolyte can be suppressed, and the storage gas production can be reduced while reducing side reactions. At the same time, the lithium sulfonamide salt has a high decomposition temperature and does not generate HF when decomposed. The lithium sulfonamide salt also may particulate in the formulation of SEI film on negative electrode so that the SEI film formed on the negative electrode can hinder the direct contact of the negative electrode with the electrolyte, thereby further effectively reducing the occurrence of side reactions. Therefore, the above two additives can synergistically improve the electrochemical performance of the electrochemical device under high temperature and high pressure to a greater extent. The electrolyte of the present application has a conductivity that satisfies 4 mS/cm~12 mS/cm at 25° C. so that the film forming effect of the above additives is good, and the electrolyte can be ensured to have good low-temperature performance and high-temperature performance.

DRAWINGS

Figure 2:
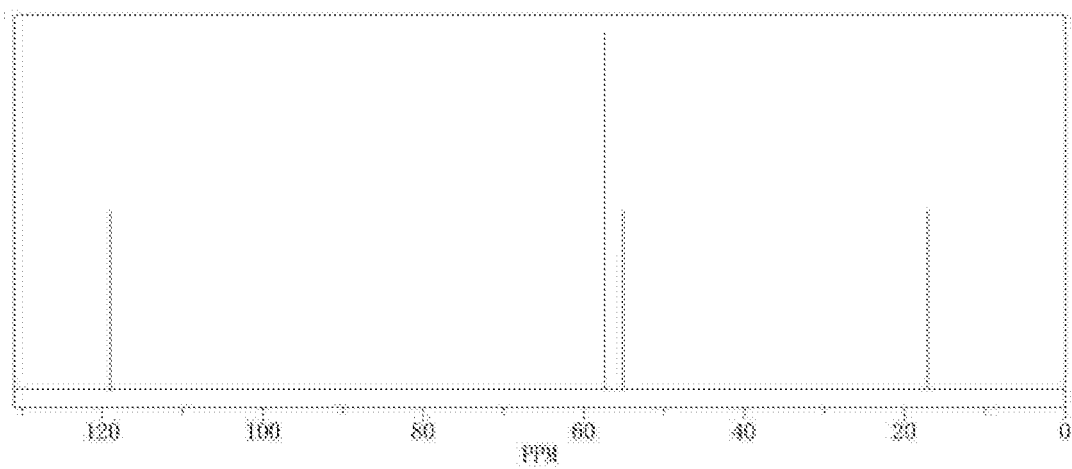
Figure 3:
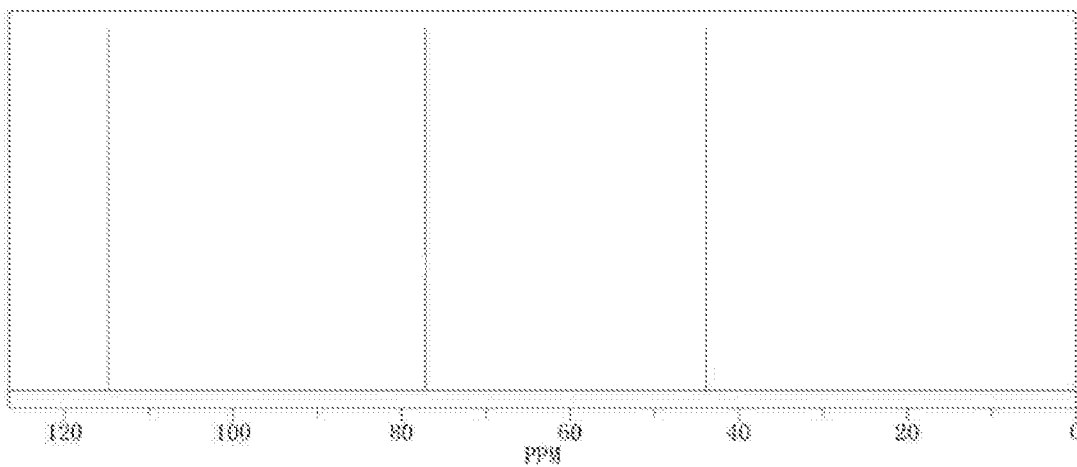

FIG. 1 is $C^{13}$ NMR spectrum of A1 compound.
FIG. 2 is $C^{13}$ NMR spectrum of A2 compound.
FIG. 3 is $C^{13}$ NMR spectrum of A3 compound.

DETAILED DESCRIPTION

The electrolyte and electrochemical device according to the present application will be described in detail below.

First, the electrolyte according to the first aspect of the present application will be explained.

The electrolyte according to the first aspect of the present application comprises an additive A and an additive B, wherein the additive A is present in an amount of 0.001% to 10% by mass in the electrolyte and the additive B is present in an amount of 0.1% to 10% by mass in the electrolyte and wherein the electrolyte has a conductivity of 4 mS/cm to 12 mS/cm at 25° C.

[Additive A]

In the electrolyte according to the first aspect of the present application, the additive A is selected from one or more of the compounds represented by Formula I-1, Formula I-2, and Formula I-3. In Formula I-1, Formula I-2, Formula I-3: $R_1$, $R_2$, $R_3$, $R_4$ are each independently selected from a hydrogen atom, a halogen atom, a substituted or unsubstituted $C_1$-$C_{12}$ alkyl group, a substituted or unsubstituted $C_1$-$C_{12}$ alkoxy group, a substituted or unsubstituted $C_1$-$C_{12}$ amino group, a substituted or unsubstituted $C_2$-$C_{12}$ alkenyl group, a substituted or unsubstituted $C_2$-$C_{12}$ alkynyl group, a substituted or unsubstituted $C_6$-$C_{26}$ aryl group, or a substituted or unsubstituted $C_2$-$C_{12}$ heterocyclic group, wherein the substituent (in the case where a substitution occurs in "substituted or unsubstituted") is selected from one or more of a halogen atom, a cyano group, a $C_1$-$C_6$ alkyl group, a $C_2$-$C_6$ alkenyl group, and a $C_1$-$C_6$ alkoxy group; wherein x, y, and z are each independently selected from an integer of 0 to 8; m, n, and k are each independently selected from an integer of 0 to 2. In $R_1$, $R_2$, $R_3$, and $R_4$, the alkyl group, the alkenyl group, and the alkynyl group may be a chain structure or a cyclic structure, and the chain structure is further divided into a linear structure and a branched structure; and the halogen atom may be selected from one or more of a fluorine atom, a chlorine atom, and a bromine atom, preferably, a fluorine atom.

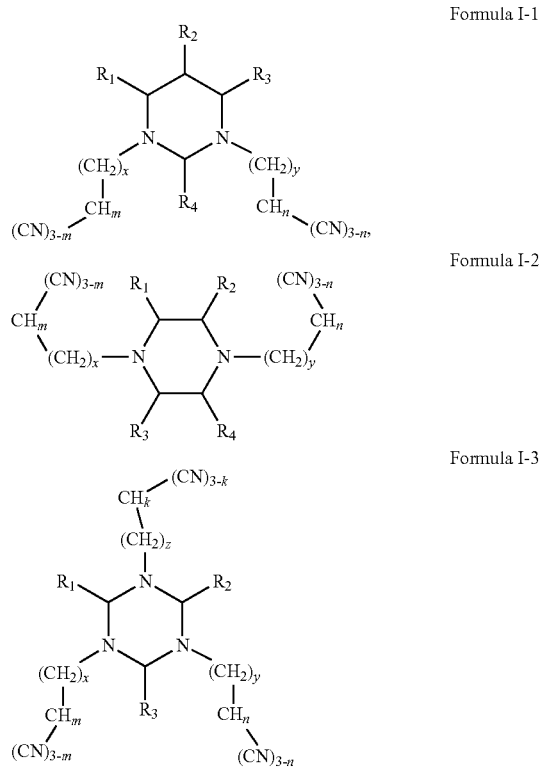

Formula I-1

Formula I-2

Formula I-3

In the electrolyte of the first aspect of the present application, the additive A is a nitrogen-containing six-membered heterocyclic compound with more than one cyano group in which the lone pair electrons contained in the nitrogen atom of the cyano group and the 3d empty orbit of the transition metal may have strong complexation. Therefore, when it is applied to the electrolyte, it can be adsorbed on the surface of positive active materials to form a layer of loose porous protective film, which can effectively passivate the surface of positive active materials, and isolate the surface of positive active material from directly contacting with the electrolyte without affecting the normal transportion of ions, thus reduce the surface activity of the positive active materials while inhibiting the oxidation effect thereof on the electrolyte, avoid a large number of side reactions on the surface of positive active materials, thereby reducing side products and reducing the gas production. In addition, the nitrogen-containing six-membered heterocyclic compound with more than one cyano group has a special nitrogen-containing six-membered heterocyclic structure, such that the distance between the cyano groups is closer to the distance between the transition metals on the surface of positive active materials, the complexation of the cyano group can be maximized, a larger amount of cyano groups can play the role of complexation to enhance the surface passivation effect of positive active materials. The special nitrogen-containing six-membered heterocyclic structure can also affect the film-formation potential of cyano groups and the film-forming effect on the surface of positive active materials etc., which further improves the electrochemical performance of the entire system, such as reducing storage gas production, improving high-temperature and high-pressure cycle performance, and the like. At the same time, the nitrogen-containing six-membered heterocyclic compound with more than one cyano group can improve the conductivity of the electrolyte to some extent and improve the dynamic performance, so it also has a certain improvement effect on the low temperature performance.

In the electrolyte according to the first aspect of the present application, the additive is present in an amount of 0.001% to 10% by mass in the electrolyte. If the content of the additive A is too low, its effect on improvement of the electrolyte is not significant, and if the content of the additive A is too high, the thickness of the complex layer as formed by its absorption on the surface of positive active materials is too large, then the positive electrode impedance is greatly increased, which deteriorates the performance of the electrochemical device. Preferably, the upper limit of the content of additive A may be selected from 10%, 9%, 8%, 7%, 6%, 5%, 4.5%, 4%, 3.5%, 3%, 2%, 1% and 0.8% by mass, and the lower limit of the content of additive A may be optionally selected from 0.001%, 0.005%, 0.01%, 0.05%, 0.1%, 0.3%, 0.5%, 0.6%, 0.8%, 0.9%, 1.0% and 1.2% by mass. Further preferably, the content of additive A may be in the range of 0.01% to 6% by mass. More preferably, the content of additive A may be in the range of 0.1% to 3.5% by mass.

In the electrolyte according to the first aspect of the present application, in the compounds of Formula I-1, Formula I-2, and Formula I-3:

The $C_1$-$C_{12}$ alkyl group may be a chain alkyl group or a cyclic alkyl group, and the chain alkyl group may be a linear alkyl group or a branched alkyl group, and the hydrogen located on the ring of the cyclic alkyl group may be further substituted by an alkyl group. The lower limit of the number of carbon atoms in the $C_1$-$C_{12}$ alkyl group is preferably 1, 2, 3, 4, and 5 and the upper limit is preferably 3, 4, 5, 6, 8, 10, and 12. Preferably, a $C_1$-$C_{10}$ alkyl group is used; more preferably, a $C_1$-$C_6$ chain alkyl group or a $C_3$-$C_8$ cyclic alkyl group is used; and still more preferably, a $C_1$-$C_4$ chain alkyl group or a $C_5$-$C_7$ cyclic alkyl group is used. Specific examples of the $C_1$-$C_{12}$ alkyl group include methyl, ethyl, n-propyl, isopropyl, n-butyl, isobutyl, sec-butyl, tert-butyl, n-pentyl, isopentyl, neopentyl, hexyl, 2-methyl-pentyl, 3-methyl-pentyl, 1,1,2-trimethyl-propyl, 3,3-dimethyl-butyl, heptyl, 2-heptyl, 3-heptyl, 2-methylhexyl, 3-methylhexyl, isoheptyl, octyl, nonyl and decyl.

In the case that the above-mentioned $C_1$-$C_{12}$ alkyl group contains an oxygen atom, it may be a $C_1$-$C_{12}$ alkoxy group. Preferably, a $C_1$-$C_{10}$ alkoxy group is used; further preferably, a $C_1$-$C_6$ alkoxy group is used; and still more preferably, a $C_1$-$C_4$ alkoxy group is used. Specific examples of the $C_1$-$C_{12}$ alkoxy group include methoxy group, ethoxy group, n-propoxy group, isopropoxy group, n-butoxy group, sec-butoxy group, tert-butoxy group, n-pentyloxy group, isopentyloxy group, cyclopentyloxy group and cyclohexyloxy group.

The $C_2$-$C_{12}$ alkenyl group may be a cyclic alkenyl group or a chain alkenyl group, and the chain alkenyl group may be a linear alkenyl group or a branched alkenyl group. Further, the number of double bonds in the $C_2$-$C_{12}$ alkenyl group is preferably one. The lower limit of the number of carbon atoms in the $C_2$-$C_{12}$ alkenyl group is preferably 2, 3, 4, and 5 and the upper limit is preferably 3, 4, 5, 6, 8, 10, and 12. Preferably, a $C_2$-$C_{10}$ alkenyl group is used; further preferably, a $C_2$-$C_6$ alkenyl group is used; and still more preferably, a $C_2$-$C_5$ alkenyl group is used. Specific examples of the $C_2$-$C_{12}$ alkenyl group include vinyl, allyl, isopropenyl, pentenyl, cyclohexenyl, cycloheptenyl, and cyclooctenyl.

The $C_2$-$C_{12}$ alkynyl group may be a cyclic alkynyl group or a chain alkynyl group, and the chain alkynyl group may be a linear alkynyl group or a branched alkynyl group. Further, the number of the triple bonds in the $C_2$-$C_{12}$ alkynyl groups is preferably one. The lower limit of the number of carbon atoms in the $C_2$-$C_{12}$ alkynyl group is preferably 2, 3, 4, and 5 and the upper limit is preferably 3, 4, 5, 6, 8, 10, and 12. Preferably, a $C_2$-$C_{10}$ alkynyl group is used; further preferably, a $C_2$-$C_6$ alkynyl group is used; and still more preferably, a $C_2$-$C_5$ alkynyl group is used. Specific examples of the $C_2$-$C_{12}$ alkynyl group include ethynyl, propargyl, isopropynyl, pentynyl, cyclohexynyl, cycloheptynyl, and cyclooctynyl.

The $C_1$-$C_{12}$ amino group may be selected from

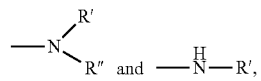

wherein R' and R" are selected from a $C_1$-$C_{12}$ alkyl group.

The $C_6$-$C_{26}$ aryl group may be a phenyl group, a phenylalkyl group, a biphenyl group, a fused polycylcic aromatic hydrocarbyl group (for example, a naphthyl group, an anthracenyl group, a phenanthryl group), wherein the biphenyl group and the fused polycylcic aromatic hydrocarbyl group may be further substituted by alkyl or alkenyl. Preferably, a $C_6$-$C_{16}$ aryl group is used; further preferably, a $C_6$-$C_{14}$ aryl group is used; and still more preferably, a $C_6$-$C_9$ aryl group is used. Specific examples of the $C_6$-$C_{26}$ aryl group include phenyl, benzyl, biphenyl, p-methylphenyl, o-methylphenyl, m-methylphenyl, naphthyl, anthracenyl, and phenanthryl.

The hetero atom in the $C_2$-$C_{12}$ heterocyclic group may be selected from one or more of oxygen, nitrogen, sulfur, phosphorus, and boron, and the heterocyclic ring may be an aliphatic or aromatic heterocyclic ring. Preferably, a $C_2$-$C_{10}$ heterocyclic group is used; further preferably, a $C_2$-$C_7$ heterocyclic group is used; and still more preferably, a five-membered aromatic heterocyclic ring, a six-membered aromatic heterocyclic ring, or a benzoheterocyclic ring is used. Specific examples of the $C_2$-$C_{12}$ heterocyclic group include oxiranyl, oxetanyl, thiaranyl, aziridinyl, β-propiolactone group, furanyl, thiophenyl, pyrrolyl, thiazolyl, imidazolyl, pyridinyl, pyrazinyl, pyrimidinyl, pyridazinyl, indolyl and quinolinyl.

(1) Specifically, the compound represented by Formula I-1 is a pyrimidine compound containing more than one cyano group.

In Formula I-1, it is preferred that $R_1$, $R_2$, $R_3$ and $R_4$ are each independently selected from a hydrogen atom, a fluorine atom, a chlorine atom, a bromine atom, a substituted or unsubstituted $C_1$-$C_6$ linear or branched alkyl group, a substituted or unsubstituted $C_5$-$C_9$ cyclic alkyl group, a substituted or unsubstituted $C_1$-$C_6$ alkoxy group, a substituted or unsubstituted $C_1$-$C_6$ amino group, a substituted or unsubstituted $C_2$-$C_6$ alkenyl group, a substituted or unsubstituted $C_2$-$C_6$ alkynyl group, a substituted or unsubstituted $C_6$-$C_{12}$ aryl group, a substituted or unsubstituted $C_2$-$C_{12}$ heterocyclic group, wherein the substituent may be selected from one or more of halogen atoms. It is further preferred that $R_1$, $R_2$, $R_3$ and $R_4$ are each independently selected from a hydrogen atom, a fluorine atom, a chlorine atom, a bromine atom, a substituted or unsubstituted $C_1$-$C_3$ linear or branched alkyl group, a substituted or unsubstituted $C_5$-$C_7$ cyclic alkyl group, a substituted or unsubstituted $C_1$-$C_3$ alkoxy group, a substituted or unsubstituted $C_1$-$C_3$ amino group, a substituted or unsubstituted $C_2$-$C_3$ alkenyl group, a substituted or unsubstituted $C_2$-$C_3$ alkynyl group, a substituted or unsubstituted $C_6$-$C_8$ aryl group, a substituted or unsubstituted $C_2$-$C_7$ heterocyclic group, wherein the substituent may be selected from one or more of halogen atoms.

In Formula I-1, x is preferably selected from an integer of 0 to 6, further preferably selected from an integer of 0 to 4, more preferably selected from 1 or 2.

In Formula I-1, y is preferably selected from an integer of 0 to 6, further preferably selected from an integer of 0 to 4, more preferably selected from 1 or 2.

In Formula I-1, it is preferred that $R_1$ and $R_3$ are the same group and it is further preferred that $R_1$, $R_3$ and $R_4$ are all the same group.

In Formula I-1, it is preferred that $R_1$ and $R_3$ are each a hydrogen atom; it is further preferred that $R_1$, $R_3$ and $R_4$ are each a hydrogen atom and it is still more preferred that $R_1$, $R_2$, $R_3$ and $R_4$ are each a hydrogen atom, or $R_1$, $R_3$ and $R_4$ are each a hydrogen atom, and $R_2$ is selected from a fluorine atom, a chlorine atom, a bromine atom, a substituted or unsubstituted $C_1$-$C_6$ linear or branched alkyl group, a substituted or unsubstituted $C_1$-$C_6$ alkoxy group, wherein the substituent is selected from one or more of halogen atoms, and preferably, the substituent is selected from a fluorine atom.

Preferably, the compound represented by Formula I-1 may be specifically selected from one or more of the following compounds, but not limited thereto:

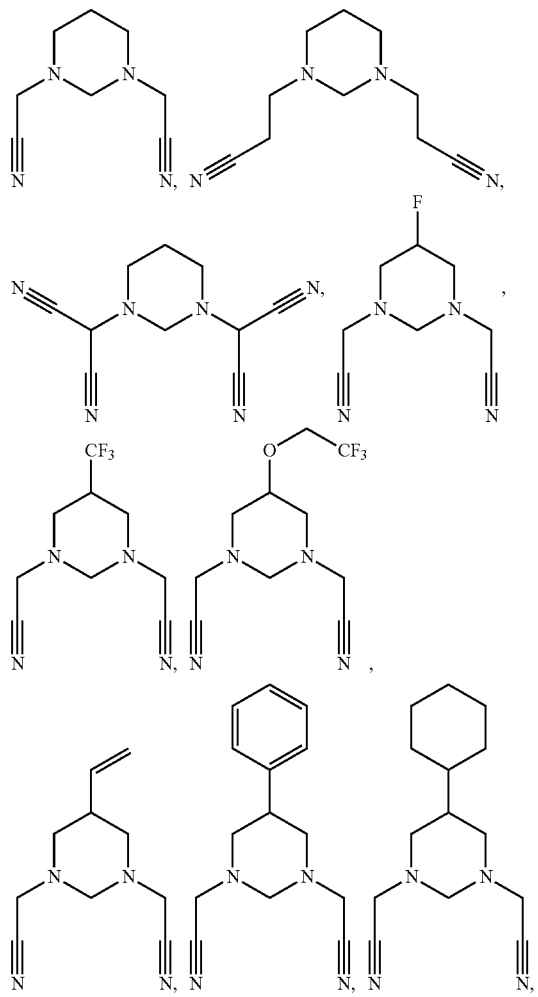

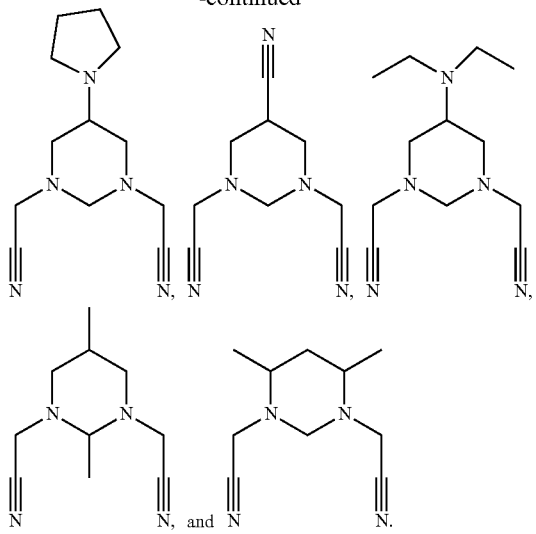

(2) Specifically, the compound represented by Formula I-2 is a piperazine compound containing more than one cyano group.

In Formula I-2, it is preferred that $R_1$, $R_2$, $R_3$ and $R_4$ are each independently selected from a hydrogen atom, a fluorine atom, a chlorine atom, a bromine atom, a substituted or unsubstituted $C_1$-$C_6$ linear or branched alkyl group, a substituted or unsubstituted $C_5$-$C_9$ cyclic alkyl group, a substituted or unsubstituted $C_1$-$C_6$ alkoxy group, a substituted or unsubstituted $C_1$-$C_6$ amino group, a substituted or unsubstituted $C_2$-$C_6$ alkenyl group, a substituted or unsubstituted $C_2$-$C_6$ alkynyl group, a substituted or unsubstituted $C_6$-$C_{12}$ aryl group, and a substituted or unsubstituted $C_2$-$C_{12}$ heterocyclic group, wherein the substituent is selected from one or more of halogen atoms. It is further preferred that $R_1$, $R_2$, $R_3$ and $R_4$ are each independently selected from a hydrogen atom, a fluorine atom, a chlorine atom, a bromine atom, a substituted or unsubstituted $C_1$-$C_3$ linear or branched alkyl group, a substituted or unsubstituted $C_5$-$C_7$ cyclic alkyl group, a substituted or unsubstituted $C_1$-$C_3$ alkoxy group, a substituted or unsubstituted $C_1$-$C_3$ amino group, a substituted or unsubstituted $C_2$-$C_3$ alkenyl group, a substituted or unsubstituted $C_2$-$C_3$ alkynyl group, a substituted or unsubstituted $C_6$-$C_8$ aryl group, and a substituted or unsubstituted $C_2$-$C_7$ heterocyclic group, wherein the substituent is selected from one or more of halogen atoms.

In Formula I-2, x is preferably selected from an integer of 0 to 6, further preferably selected from an integer of 0 to 4, more preferably selected from 1 or 2.

In Formula I-2, y is preferably selected from an integer of 0 to 6, further preferably selected from an integer of 0 to 4, more preferably selected from 1 or 2.

In Formula I-2, it is preferred that at least two of $R_1$, $R_2$, $R_3$ and $R_4$ are the same group, and it is further preferred that at least three of $R_1$, $R_2$, $R_3$ and $R_4$ are the same group.

In Formula I-2, it is preferred that at least two of $R_1$, $R_2$, $R_3$ and $R_4$ are a hydrogen atom; it is further preferred that at least three of $R_1$, $R_2$, $R_3$ and $R_4$ are a hydrogen atom; and it is still more preferred that $R_1$, $R_2$, $R_3$ and $R_4$ are each a hydrogen atom, or three of $R_1$, $R_2$, $R_3$ and $R_4$ are a hydrogen atom, and the remaining one is selected from a fluorine atom, a chlorine atom, a bromine atom, a substituted or unsubstituted $C_1$-$C_6$ linear or branched alkyl group and a substituted or unsubstituted $C_1$-$C_6$ alkoxy group, wherein the substituent is selected from one or more of halogen atoms, and preferably, the substituent is selected from a fluorine atom.

Preferably, the compound of Formula I-2 may be specifically selected from one or more of the following compounds, but not limited thereto:

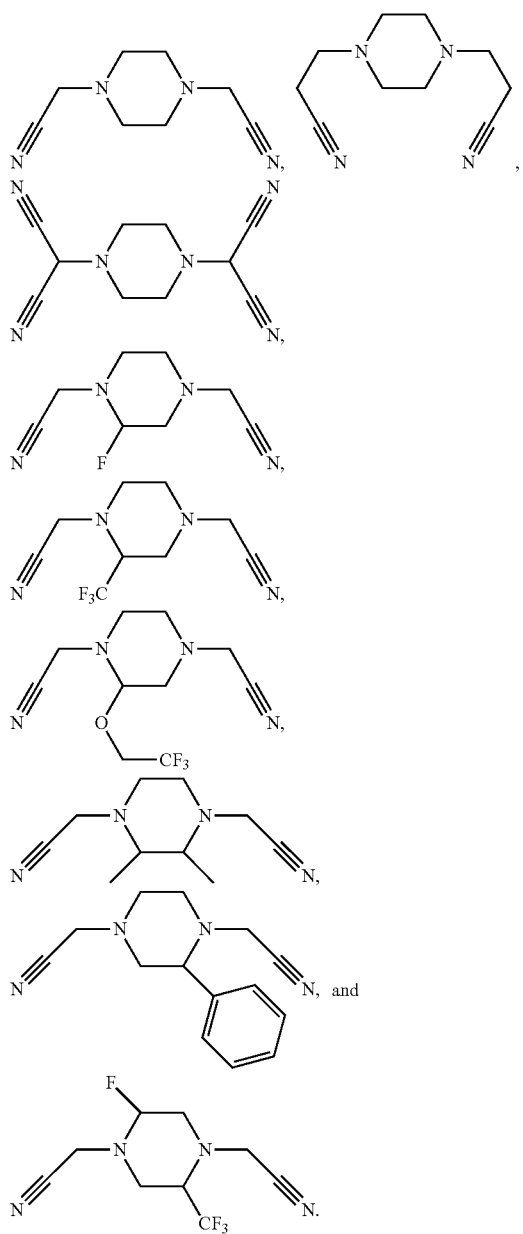

(3) Specifically, the compound represented by Formula I-3 is a s-triazine compound containing more than one cyano group.

In Formula I-3, it is preferred that $R_1$, $R_2$ and $R_3$ are each independently selected from a hydrogen atom, a fluorine atom, a chlorine atom, a bromine atom, a substituted or unsubstituted $C_1$-$C_6$ linear or branched alkyl group, a substituted or unsubstituted $C_5$-$C_9$ cyclic alkyl group, a substituted or unsubstituted $C_1$-$C_6$ alkoxy group, a substituted or unsubstituted $C_1$-$C_6$ amino group, a substituted or unsubstituted $C_2$-$C_6$ alkenyl group, a substituted or unsubstituted $C_2$-$C_6$ alkynyl group, a substituted or unsubstituted $C_6$-$C_{12}$ aryl group and a substituted or unsubstituted $C_2$-$C_{12}$ heterocyclic group, wherein the substituent is selected from one or more of halogen atoms. It is further preferred that $R_1$, $R_2$ and $R_3$ are each independently selected from a hydrogen atom, a fluorine atom, a chlorine atom, a bromine atom, a substituted or unsubstituted $C_1$-$C_3$ linear or branched alkyl group, a substituted or unsubstituted $C_5$-$C_7$ cyclic alkyl group, a substituted or unsubstituted $C_1$-$C_3$ alkoxy group, a substituted or unsubstituted $C_1$-$C_3$ amino group, a substituted or unsubstituted $C_2$-$C_3$ alkenyl group, a substituted or unsubstituted $C_2$-$C_3$ alkynyl group, a substituted or unsubstituted $C_6$-$C_8$ aryl group and a substituted or unsubstituted $C_2$-$C_7$ heterocyclic group, wherein the substituent is selected from one or more of halogen atoms.

In Formula I-3, x is preferably selected from an integer of 0 to 6, further preferably selected from an integer of 0 to 4, more preferably from 1 or 2.

In Formula I-3, y is preferably selected from an integer of 0 to 6, further preferably selected from an integer of 0 to 4, more preferably selected from 1 or 2.

In Formula I-3, it is preferred that at least two of $R_1$, $R_2$ and $R_3$ are the same group.

In Formula I-3, it is preferred that at least two of $R_1$, $R_2$, and $R_3$ are hydrogen atoms and it is further preferred that $R_1$, $R_2$ and $R_3$ are each a hydrogen atom, or two of $R_1$, $R_2$ and $R_3$ are a hydrogen atom, and the remaining one is selected from a fluorine atom, a chlorine atom, a bromine atom, a substituted or unsubstituted $C_1$-$C_6$ linear or branched alkyl group and a substituted or unsubstituted $C_1$-$C_6$ alkoxy group, wherein the substituent is selected from one or more of halogen atoms, preferably, the substituent is selected from a fluorine atom.

Preferably, the compound represented by Formula I-3 may be specifically selected from one or more of the following compounds, but not limited thereto:

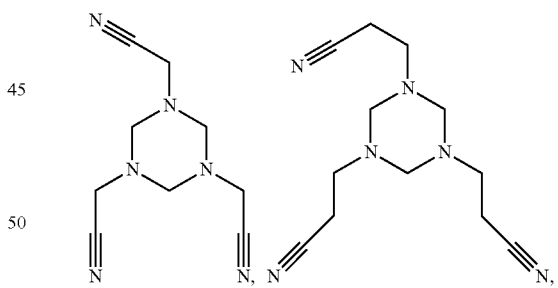

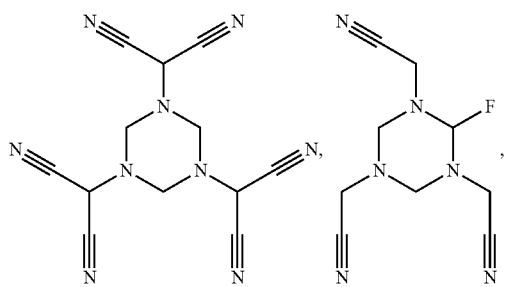

-continued

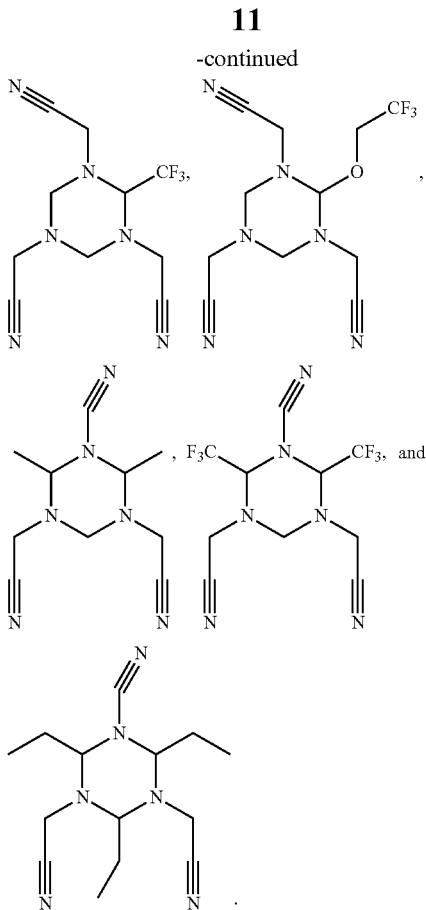

[Additive B]

In the electrolyte of the first aspect of the present application, the additive B is selected from a lithium sulfonimide salt represented by formula II.

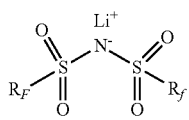

Formula II

In the formula II, $R_F$ is one of $C_{p1}F_{2p1+1}$ and $F(CF_2CF_2O)_{q1}CF_2CF_2$, $R_f$ is one of $C_{p2}F_{2p2+1}$ and $F(CF_2CF_2O)_{q2}CF_2CF_2$, p1 and p2 are each independently selected from an integer of 0 to 8; and q1 and q2 are each independently selected from an integer of 1 to 6.

Preferably, $R_F$ is $C_{p1}F_{2p1+1}$, $R_f$ is one of $C_{p2}F_{2p2+1}$ and p1 and p2 are each independently selected from an integer of 0 to 4.

Further preferably, the additive B is selected from one or more of the following compounds:

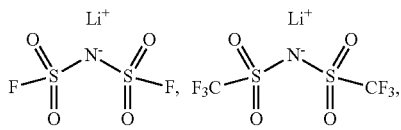

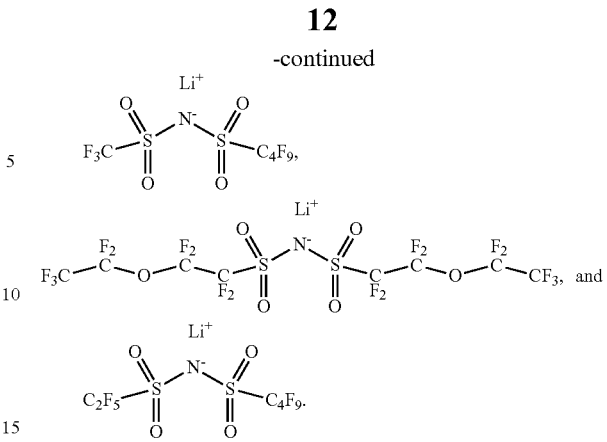

In the electrolyte of the first aspect of the present application, the additive B on the one hand has a high decomposition temperature, and does not generate HF when decomposed, that is, having a remarkably stronger thermal stability than LiPF6, so that it may remarkably improve the cycle performance and storage of the electrochemical device. On the other hand, it can also participate in the formation of SEI film on the negative electrode, so that the SEI film formed on the negative electrode can hinder the negative electrode from directly contacting the electrolyte, thereby effectively reducing the occurrence of side reactions.

In the electrolyte of the first aspect of the present application, the additive B is present in an amount of 0.1% to 10% by mass in the electrolyte. If the content of the additive B is too low, its effect on improvement of the electrolyte is not significant, and if the content of the additive B is too high, it will strongly corrode the positive current collector at a high voltage, and lower the cycle capacity retention rate of the electrochemical device, which deteriorates the performance of the electrochemical device. Preferably, the upper limit of the content of additive B may be selected from 10%, 9%, 8%, 7%, 6%, 5%, 4.5%, 4%, 3.5%, 3%, 2%, 1.5% by mass, and the lower limit of the content of additive B may be optionally selected from 0.1%, 0.25%, 0.5%, 0.6%, 0.8%, 0.9%, 1.0% and 1.2% by mass. Further preferably, the content of additive B may be in the range of 0.5% to 6% by mass. More preferably, the content of additive B may be in the range of 1% to 4% by mass.

[Additive C]

In the electrolyte of the first aspect of the present application, the electrolyte may further include an additive C selected from one or more of a cyclic carbonate compound containing a carbon-carbon unsaturated bond, and a halogen-substituted cyclic carbonate compound.

In the electrolyte of the first aspect of the present application, the cyclic carbonate compound containing a carbon-carbon unsaturated bond may be selected from one or more of the compounds represented by Formula III-I. In Formula III-1, $R_{20}$ is selected from a $C_1$-$C_6$ alkylene group with an alkenyl group or an alkynyl group in its branched chain and a substituted or unsubstituted $C_2$-$C_6$ linear alkenylene group, wherein the substituent is selected from one or more of a halogen atom, a $C_1$-$C_6$ alkyl group and a $C_2$-$C_6$ alkenyl group.

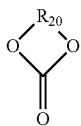

Formula III-1

Preferably, the cyclic carbonate compound containing a carbon-carbon unsaturated bond may be specifically selected from one or more of the following compounds, but not limited thereto:

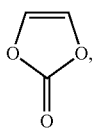

(VC)

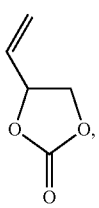

(VEC)

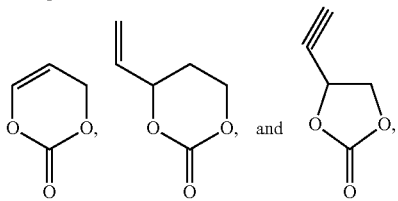

In the electrolyte of the first aspect of the present application, the halogen-substituted cyclic carbonate compound is selected from one or more of the compounds represented by Formula III-2. In Formula III-2, $R_{21}$ is selected from one or more of a halogen-substituted $C_1$-$C_6$ alkylene group and a halogen-substituted $C_2$-$C_6$ alkenylene group.

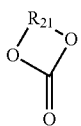

Formula III-2

Specifically, the halogen-substituted cyclic carbonate compound is selected from one or more of the following compounds having the particular structural formula:

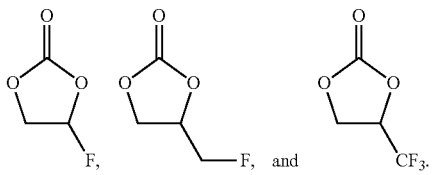

In the electrolyte of the first aspect of the present application, the additive C has a higher reduction potential, and it will be preferentially reduced on the surface of negative electrode in the electrolyte to form a dense SEI film, preventing the destruction to the structure of negative electrode active materials due to solvation of lithium ions. Moreover the additive C has also a higher oxidation potential, has a better oxidation stability, and thus does not cause side reactions on the surface of positive electrode.

In the electrolyte of the first aspect of the present application, the additive C is present in an amount of 0.1% to 10% by mass in the electrolyte. If the content of the additive C is too low, its effect on improvement of the electrolyte is not significant, and if the content of the additive C is too high, it will form a too thick layer on the positive electrode, and lower the cycle capacity retention rate of the electrochemical device, which deteriorates the performance of the electrochemical device. Preferably, the upper limit of the content of additive C may be selected from 10%, 9%, 8%, 7%, 6%, 5%, 4.5%, 4%, 3.5%, 3%, 2%, 1.5% by mass, and the lower limit of the content of additive C may be optionally selected from 0.1%, 0.25%, 0.5%, 0.6%, 0.8%, 0.9%, 1.0% and 1.2% by mass. Further preferably, the content of additive C may be in the range of 0.5% to 6% by mass. More preferably, the content of additive C may be in the range of 1% to 3% by mass.

In the formula III-1 and formula III-2:

The $C_1$-$C_6$ alkylene group may be a linear alkylene group or a branched alkylene group. The number of carbon atoms in the $C_1$-$C_6$ alkylene group is preferably 2 or 3, and it is preferred that the upper limit is 4, 5, and 6. Preferably, a $C_1$-$C_4$ alkylene group is used. Specific examples of the $C_1$-$C_6$ alkylene group include methylene, ethylene, propylene, isopropylidene, butylene, isobutylene, sec-butylene, pentylene, and hexylene.

The $C_2$-$C_6$ alkenylene group is a linear alkenylene group or a branched alkenylene group. The number of double bonds in the $C_2$-$C_6$ alkenylene group is preferably one. The lower limit of the carbon atoms in the $C_2$-$C_6$ alkenylene group preferably is preferably 2, 3, and 4, and it is preferred that the upper limit is 3, 4, 5, and 6. Preferably, a $C_2$-$C_5$ alkenylene group is used. Specific examples of the $C_2$-$C_6$ alkenylene group include vinylidene, allylene, isopropenylene, butylene group, and pentenylene.

In the electrolyte of the first aspect of the present application, the electrolyte may be a liquid electrolyte, a solid electrolyte, or a gel electrolyte. An organic solvent, an electrolyte salt, a polymer, or the like may also be included in the electrolyte.

In the present application, only the liquid electrolyte is further described in detail, and the liquid electrolyte further includes an organic solvent and an electrolyte salt.

[Organic Solvents]

The organic solvent used in the electrolyte of the embodiment of the present application comprises a cyclic carbonate and a chain carbonate, which may further improve the cycle performance and storage performance under high temperature and high voltage, and which will easily adjust conductivity of the electrolyte to an appropriate range (i.e. conductivity of 4 mS/cm to 12 mS/cm at 25° C.). Thus, it is more favorable for the additive film A and the additive B to achieve a better film forming effect.

Specifically, the cyclic carbonate may be selected from one or more of ethylene carbonate, propylene carbonate, 1,2-butylene carbonate, and 2,3-butylene glycol carbonate. More preferably, the cyclic carbonate may be selected from one or more of ethylene carbonate and propylene carbonate.

Specifically, the chain carbonate may be an asymmetric chain carbonate selected from one or more of ethyl methyl carbonate, methyl propyl carbonate, methyl isopropyl carbonate, methyl butyl carbonate, and ethyl propyl carbonate; a symmetric chain carbonate selected from one or more of dimethyl carbonate, diethyl carbonate, dipropyl carbonate, and dibutyl carbonate; or a mixture of an asymmetric chain carbonate with a symmetric chain carbonate.

The organic solvent may further comprise a carboxylic acid ester. That is to say, the organic solvent according to the present application may comprise a mixture of a cyclic carbonate, a chain carbonate, and a carboxylic acid ester.

Specifically, the carboxylic acid ester may be selected from one or more of methyl pivalate, ethyl pivalate, propyl pivalate, butyl pivalate, methyl butyrate, ethyl butyrate, propyl butyrate, butyl butyrate, methyl propionate, ethyl propionate, propyl propionate, butyl propionate, methyl acetate, ethyl acetate, propyl acetate and butyl acetate.

Carboxylic acid esters have the characteristics of large dielectric constant and low viscosity, which can effectively prevent the association of lithium ions with anions in the electrolyte, and are more advantageous to cyclic carbonates and chain carbonates, in terms of ion conduction, especially at low temperature, thus the electrolyte can be guaranteed to have good ion conductivity.

Based on the total mass of the organic solvent, the content of the cyclic carbonate is 15% to 55% by mass, preferably 25% to 50% by mass; the content of the chain carbonate is 15% to 74% by mass, preferably 25% to 70% by mass; and the content of the carboxylic acid ester is 0.1% to 70% by mass, preferably 5% to 50% by mass.

[Electrolytic Salt]

As the electrolytic salt used in the present application, the following lithium salt can be suitably exemplified.

[Li salt-Type I]: It may be "a complex salts of Lewis acid with LiF" suitably selected from one or more of $LiPF_6$, $LiBF_4$, $LiAsF_6$, $LiSbF_6$, $LiPF_4(CF_3)_2$, $LiPF_3(C_2F_5)_3$, $LiPF_3(CF_3)_3$, $LiPF_3(iso-C_3F_7)_3$, and $LiPF_5(iso-C_3F_7)$, preferably from $LiPF_6$, $LiBF_4$, $LiAsF_6$, and more preferably from $LiPF_6$ and $LiBF_4$.

[Li salt-Type II]: It may be "an imine or methylated lithium salt" suitably selected from one or more of $(CF_2)_2(SO_2)_2NLi$ (cyclic), $(CF_2)_3(SO_2)_2NLi$ (cyclic), and $LiC(SO_2CF_3)_3$.

[Li salt-Type III]: It may be "a lithium salt containing the structure of $S(=O)_2O$" suitably selected from one or more of $LiSO_3F$, $LiCF_3SO_3$, $CH_3SO_4Li$, $C_2H_5SO_4Li$, $C_3H_7SO_4Li$, lithium trifluoro ((methylsulfonyl)oxy) borate (LiTFMSB), lithium pentafluoro ((methylsulfonyl)oxy) phosphate (LiPFMSP), more preferably from $LiSO_3F$, $CH_3SO_4Li$, $C_2H_5SO_4Li$ or LiTFMSB.

[Li salt-Type IV]: It may be "a lithium salt containing the structure of P=O or Cl=O" suitably selected from one or more of $LiPO_2F_2$ and $Li_2PO_3F$.

[Li salt-Type V]: It may be "a lithium salt with an oxalate ligand as a positive ion" suitably selected from lithium bis[oxalate-O,O'] borate (LiBOB), lithium difluoro [oxalate-O, O'] borate, lithium difluorobis[oxalate-O,O'] phosphate (LiPFO) and lithium tetrafluoro [oxalate-O,O'] phosphate, more preferably from LiBOB and LiPFO.

The above lithium salts may be used alone or in combination. Preferably, the lithium salt is selected from one or more of $LiPF_6$, $LiPO_2F_2$, $Li_2PO_3F$, $LiBF_4$, $LiSO_3F$, lithium trifluoro((methyl sulfonyl)oxy)borate (LiTFMSB), lithium bis[oxalate-O,O'] borate (LiBOB), lithium difluorobis[oxalate-O,O'] phosphate (LiPFO) and lithium tetrafluoro [oxalate-O,O']phosphate. More preferably, the lithium salt is selected from one or more of $LiPF_6$, $LiBF_4$, $LiSO_3F$, lithium trifluoro((methyl sulfonyl)oxy)borate (LiTFMSB), $LiPO_2F_2$, lithium bis[oxalate-O,O'] borate (LiBOB) and lithium difluorobis[oxalate-O,O'] phosphate (LiPFO). Further preferably, the lithium salt is $LiPF_6$.

In the electrolyte of the first aspect of the present application, the electrolyte has a conductivity of 4 mS/cm to 12 mS/cm at 25° C. In the case that the conductivity of the electrolyte is too small, the kinetic performance of the electrolyte is poor, the low temperature performance of the electrochemical device is poor, and the large viscosity of the electrolyte also affects the adsorption-film forming effect of the additive A on the surface of the positive electrode; in the case that the conductivity of the electrolyte is too large, the thermal stability of the electrolyte is poor, and the high temperature performance of the electrochemical device is poor.

In the electrolyte of the first aspect of the present application, the preparation method of the electrolyte is not limited, and the electrolyte can be prepared according to the conventional method for preparing an electrolyte. For example, it can be obtained by mixing the above organic solvents and adding additives thereto.

In the electrolyte of the first aspect of the present application, the additive A can be synthesized by the following method.

Synthesis of the Compound of Formula I-1:

The reaction equation is:

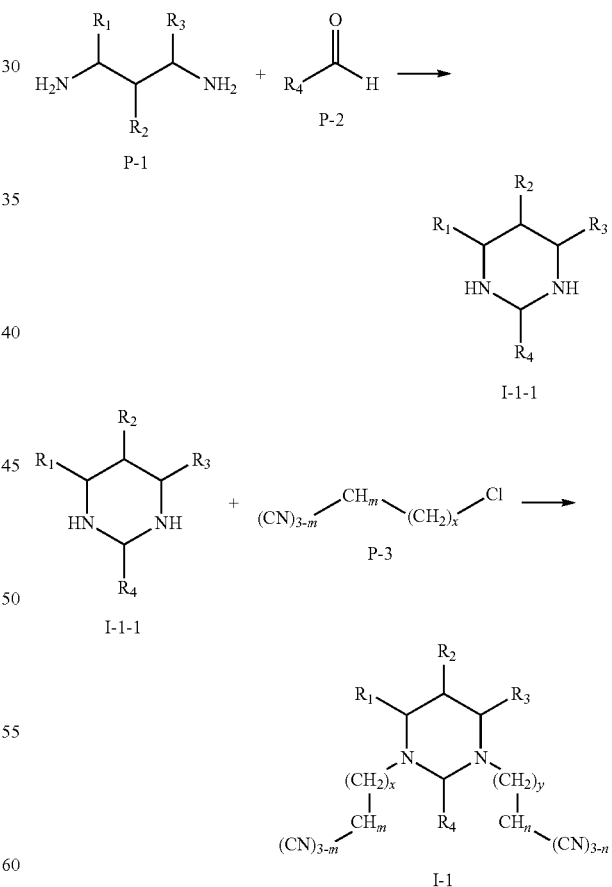

The specific preparation process is:

P-2 aqueous solution with a concentration of 30%-40% is added dropwise to the raw material P-1 in 20 min to 60 min with stirring rapidly. After the completion of the dropwise addition, the mixture is rapidly stirred for 15 h to 30 h, and stirred at 70° C. to 90° C. for 3-5 h in an oil bath, to obtain colorless fuming viscous liquid intermediate I-1-1. Then $K_2CO_3$, KI and anhydrous acetonitrile are added, and the mixture is rapidly stirred into a solid-liquid mixed phase, to which raw material P-3 is quickly added at 40° C.~60° C. After stirring for 10 h to 20 h, the resulting mixture is cooled to room temperature, and purified by isolation to obtain a compound of Formula I-1.

(2) Preparation of a Compound of Formula I-2:
The reaction equation is:

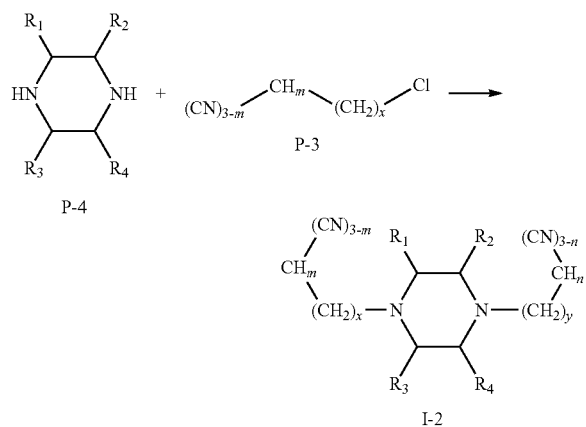

The specific preparation process is:

Anhydrous sodium carbonate, the raw material P-4 and the raw material P-3 are mixed in absolute ethanol, and the mixture is stirred for 2 to 5 hours which is then washed with hot ethanol for several times to obtain a crude product, and then the crude product is recrystallized to obtain the compound represented by Formula I-2.

(3) Preparation of a Compound of Formula I-3:
The reaction equation is:

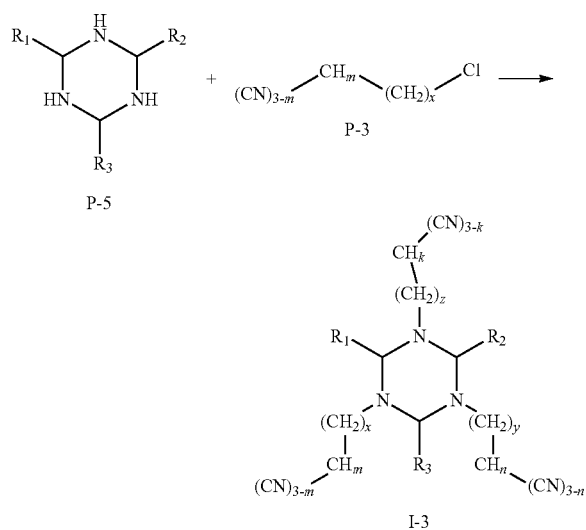

The specific preparation process is:

Anhydrous sodium carbonate, the raw material P-5 and the raw material P-3 are mixed in absolute ethanol, and the mixture is stirred for 2 to 5 hours, which is then washed with hot ethanol for several times to obtain a crude product, and then the crude product is recrystallized to obtain a compound represented by Formula I-3.

The electrochemical device according to the second aspect of the present application is explained below.

The electrochemical device according to the second aspect of the present application comprises a positive electrode plate, a negative electrode plate, a separator disposed between the positive electrode plate and the negative electrode plate, and an electrolyte according to the first aspect of the present application. It should be noted that the electrochemical device according to the second aspect of the present application may be a lithium-ion secondary battery, a lithium primary battery or a lithium-ion capacitor.

When the electrochemical device is a lithium-ion secondary battery, the positive electrode comprises a positive active material capable of deintercalating and intercalating lithium ions, and the negative electrode comprises a negative active material capable of intercalating and deintercalating lithium ions.

Specifically, the positive active material may be selected from one or more of lithium cobalt oxide, lithium nickel oxide, lithium manganese oxide, lithium nickel manganese oxide, lithium nickel cobalt manganese oxide, lithium nickel cobalt aluminum oxide, and a compound obtained by adding other transition metals or non-transition metals to the above oxides. Specifically, a layered lithium-containing oxide, a spinel-type lithium-containing oxide, an olivine-type lithium-containing phosphate compound, or the like can be used. However, the present application is not limited to these materials, and other conventionally known materials which can be used as a positive active material for a lithium-ion secondary battery can also be used. These positive active materials may be used alone or in combination of two or more.

The negative active material may be soft carbon, hard carbon, artificial graphite, natural graphite, silicon, silicon oxide, silicon carbon composite, lithium titanium oxide, and metals that can form an alloy with lithium, etc. Specifically, a carbon-based material, a silicon-based material, a tin-based material, or the like can be used. However, the lithium-ion secondary battery of the present application is not limited to these materials, and other conventionally known materials which can be used as a negative active material for a lithium-ion secondary battery can also be used. These negative active materials may be used alone or in combination of two or more.

When the electrochemical device is a lithium primary battery, specifically, the negative active materials may be metal lithium or lithium alloy and the positive active materials may be a solid halide such as copper fluoride ($CuF_2$), copper chloride ($CuCl_2$), silver chloride (AgCl), or polyfluorocarbon (($CF)_4$), a solid sulfide such as copper sulfide (CuS), iron sulfide (FeS), or iron disulfide ($FeS_2$), a solid oxide such as manganese dioxide ($MnO_2$), copper oxide (CuO), molybdenum trioxide ($MoO_3$), vanadium pentoxide ($V_2O_5$). The positive active materials may also be a solid oxyacid salt such as silver chromate ($Ag_2CrO_4$) or lead ruthenate ($Pb_2Bi_2O_5$). These positive active materials may be used alone or in combination of two or more.

When the electrochemical device is a lithium ion capacitor, the negative active material of the lithium ion capacitor is graphite, a polyacene type material, and the positive electrode active material is activated carbon.

In the electrochemical device of the second aspect of the present application, the specific type of the separator is not particularly limited, and may be any separator material used in the existing electrochemical device, such as polyethylene, polypropylene, polyvinylidene fluoride, and multilayer composite film thereof, but not limited to these.

In the electrochemical device of the second aspect of the present application, the positive electrode plate further comprises a binder and a conductive agent, which positive electrode plate is obtained by coating a positive electrode slurry containing a positive active material, a binder, and a conductive agent on the positive electrode current collector, and drying the positive electrode slurry. Similarly, the negative electrode plate likewise comprises a binder and a conductive agent, which negative electrode plate is obtained by coating a negative electrode slurry containing a negative active material, a binder, and a conductive agent on the negative electrode current collector, and drying the negative electrode slurry.

Furthermore, when the electrochemical device is a lithium-ion secondary battery, the charge cutoff voltage of the battery is not less than 4.2 V. That is to say, the lithium-ion secondary battery may be used in a high voltage state of not less than 4.2 V. Preferably, the lithium-ion secondary battery can work in the range of 4.2V to 4.9V, and further preferably, the battery can work in the range of 4.3V to 4.8V. In the high voltage state, the higher the valence state of the transition metal on the surface of the positive active material, the more electrons are lost, the more empty orbits are formed, which may easily complex with the lone pair electrons of the nitrogen atom in the additive A. That is to say, the additive A can exert a corresponding protective effect to a greater extent.

In order to make the objects, technical solutions and beneficial technical effects of the present application more clear, the present application will be further described in detail below with reference to the embodiments. It is to be understood that the embodiments described in the specification are merely illustrative of the application, and are not intended to limit the scope of the application.

In the following specific examples of the present application, only the embodiment in which the electrochemical device is a lithium-ion secondary battery is shown, but the application is not limited thereto. In the examples and comparative examples, the reagents, materials, and instruments used are commercially available unless otherwise specified. The specific synthesis process of the additives A2, A8, and A13 is as follows, and other kinds of additives A can be synthesized according to a similar process.

Synthesis of Additive A2:

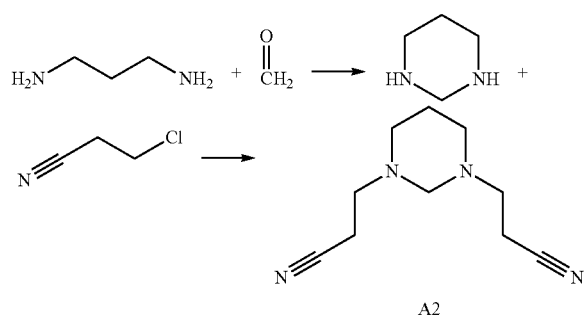

37% aqueous formaldehyde solution was added dropwise to 1,3-propanediamine in 0.5 h with stirring rapidly. After the completion of the dropwise addition, the mixture was further stirred rapidly for 20 h, followed by refluxing in an oil bath at 80° C. for 4 h to obtain a colorless fuming viscous liquid, i.e. the intermediate product hexahydropyrimidine.

To the intermediate, K$_2$CO$_3$, KI, anhydrous acetonitrile were added with stirring quickly to form a solid-liquid mixed phase. Then β-chloropropionitrile was added in 0.5 h at 60° C. with further stirring for 17 h. After that, the mixture was cooled to room temperature and was carried out separation and purification to obtain A2. The NMR spectrum was shown in FIG. 1.

Synthesis of Additive A8:

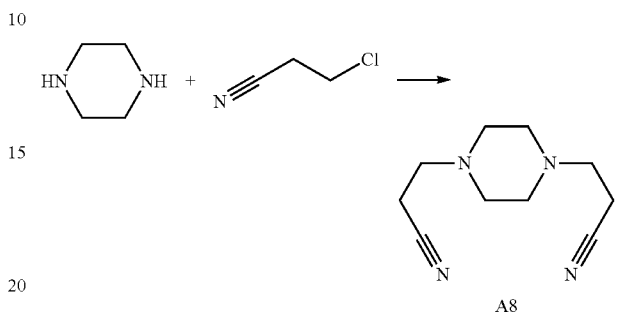

Anhydrous sodium carbonate, piperazine and β-chloropropionitrile were mixed in absolute ethanol, and the reaction mixture was stirred for 4 hours, which was washed with hot ethanol for several times to obtain a crude product, and the crude product was recrystallized to obtain A8. The NMR spectrum was shown in FIG. 2.

Synthesis of Additive A13:

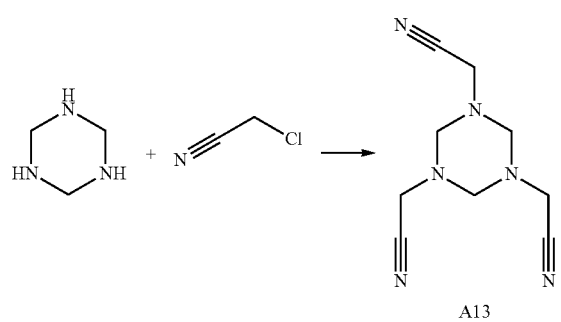

Anhydrous sodium carbonate, 1,3,5-triazine and chloroacetonitrile were mixed in absolute ethanol, and the reaction mixture was stirred for 4 hours, which was washed with hot ethanol for several times to obtain a crude product, and the crude product was recrystallized to obtain A13. The NMR spectrum was shown in FIG. 3.

In the examples and comparative examples, lithium-ion secondary batteries were prepared in the following manner.

(1) Preparation of electrolyte: The mixture of at least one of propylene carbonate (abbreviated as PC) and ethylene carbonate (abbreviated as EC), at least one of ethyl methyl carbonate (abbreviated as EMC) and diethyl carbonate (abbreviated as DEC), and at least one of methyl propionate, ethyl propionate, methyl acetate, and ethyl acetate was used as an organic solvent, and the mixing ratio thereof was adjusted to achieve a desired electrolyte viscosity and conductivity. The lithium salt was LiPF$_6$, and the total content of LiPF$_6$ was 12.5% based on the total mass of the electrolyte. Each additive was added in accordance with the composition of the electrolyte as shown in Table 1, wherein the content of each additive component was based on the total mass of the electrolyte.

The used additives are as follows:
Additive A:
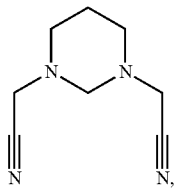
A1
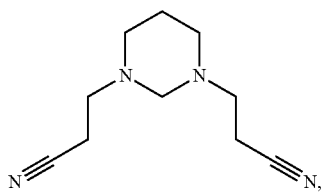
A2
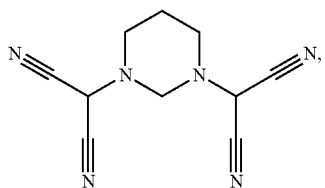
A3
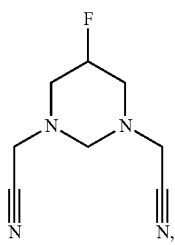
A4
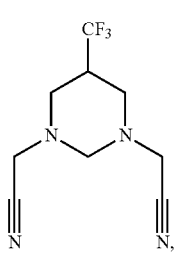
A5
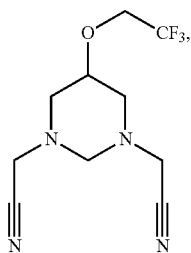
A6
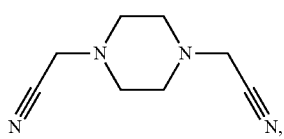
A7
-continued
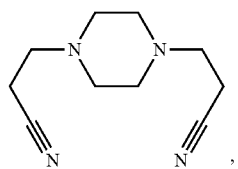
A8
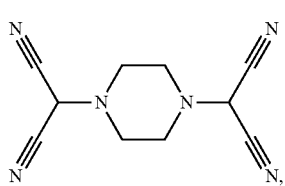
A9
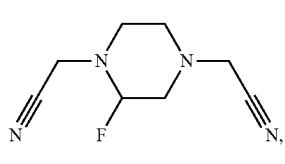
A10
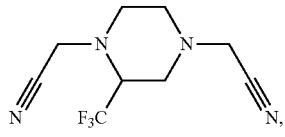
A11
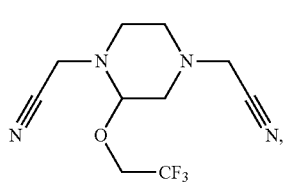
A12
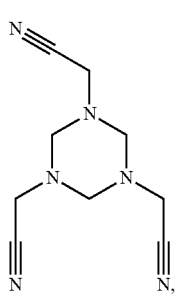
A13
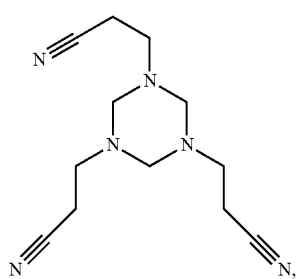
A14

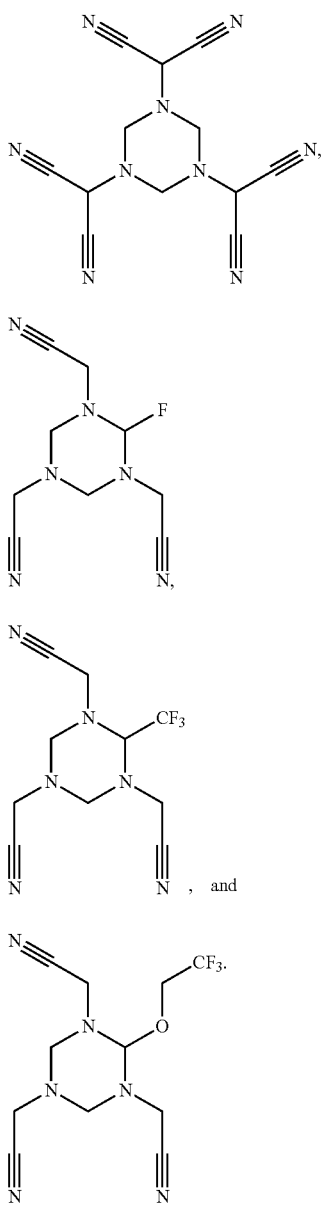

Additive B

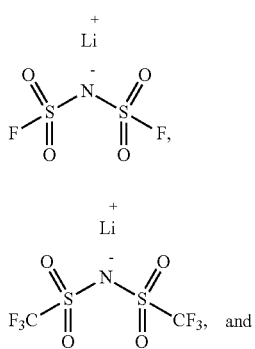

A15

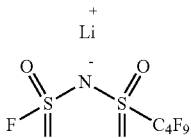

B3(LiFNFSI)

Additive C:

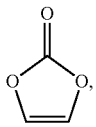

C1(VC)

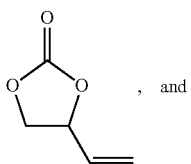

C2(VEC), and

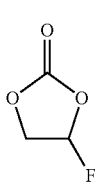

C3(FEC)

(2) Preparation of positive electrode plate: The positive active material $LiCoO_2$, the binder PVDF, the conductive agent acetylene black were mixed at a mass ratio of 98:1:1, then the N-methylpyrrolidone was added, which was stirred under a vacuum stirrer until stable and uniform, thereby obtaining a positive electrode slurry. Then the positive electrode slurry was uniformly coated on an aluminum foil, and the aluminum foil was air-dried at room temperature, and transferred to a blast oven to dry at 120° C. for 1 hour, and then subjected to cold pressing and slitting to obtain a positive electrode plate.

(3) Preparation of negative electrode plate: The negative active material graphite, the conductive agent acetylene black, the thickener carboxymethyl cellulose sodium solution, and the binder styrene-butadiene rubber emulsion are mixed at a mass ratio of 97:1:1:1, then deionized water was added, which was stirred under a vacuum stirrer until stable and uniform, thereby obtaining a negative electrode slurry. Then the negative electrode slurry was uniformly coated on the copper foil and the copper foil was air-dried at room temperature, and transferred to a blast oven to dry at 120° C. for 1 hour, and then subjected to cold pressing and slitting to obtain a negative electrode plate.

(4) Preparation of lithium-ion secondary battery: The positive electrode plate, the negative electrode plate and the PP/PE/PP separator were wound to obtain a battery core, and then the battery core was placed in the package followed by injecting an electrolyte therein, and then the sealing was sequentially performed. A lithium-ion secondary battery was obtained by processes such as standing, hot-cold pressing, chemical formation, exhausting, and capacity test.

TABLE 1

Electrolyte parameters of Examples 1-25 and Comparative Examples 1-2

|  | Conductivity | Additive A | | Additive B | | Additive C | |
|---|---|---|---|---|---|---|---|
|  | mS/cm | Type | Content | Type | Content | Type | Content |
| Example 1 | 12 | A1 | 0.001% | B1 | 10.0% | / | / |
| Example 2 | 12 | A1 | 0.1% | B3 | 8.0% | / | / |
| Example 3 | 11 | A1 | 1.0% | B2 | 6.0% | / | / |
| Example 4 | 10 | A1 | 1.5% | B2 | 4.0% | / | / |
| Example 5 | 10 | A1 | 2.0% | B1 | 4.0% | / | / |
| Example 6 | 10 | A1 | 2.0% | B2 | 4.0% | / | / |
| Example 7 | 10 | A1 | 2.0% | B3 | 4.0% | / | / |
| Example 8 | 10 | A1 | 2.0% | B2 | 3.0% | / | / |
| Example 9 | 9 | A1 | 4.0% | B3 | 2.0% | / | / |
| Example 10 | 9 | A1 | 6.0% | B2 | 1.0% | / | / |
| Example 11 | 8 | A1 | 8.0% | B1 | 0.1% | / | / |
| Example 12 | 8 | A1 | 10.0% | B3 | 0.1% | / | / |
| Example 13 | 10 | A1 | 2.0% | B1 | 4.0% | C2 | 0.1% |
| Example 14 | 10 | A1 | 2.0% | B1 | 4.0% | C3 | 0.5% |
| Example 15 | 10 | A1 | 2.0% | B1 | 4.0% | C1 | 2.0% |
| Example 16 | 10 | A1 | 2.0% | B1 | 4.0% | C1 | 3.0% |
| Example 17 | 10 | A1 | 2.0% | B1 | 4.0% | C2 | 3.0% |
| Example 18 | 10 | A1 | 2.0% | B1 | 4.0% | C3 | 3.0% |
| Example 19 | 10 | A1 | 2.0% | B1 | 4.0% | C3 | 4.0% |
| Example 20 | 10 | A1 | 2.0% | B1 | 4.0% | C3 | 5.0% |
| Example 21 | 10 | A1 | 2.0% | B1 | 4.0% | C1 | 6.0% |
| Example 22 | 10 | A1 | 2.0% | B1 | 4.0% | C2 | 8.0% |
| Example 23 | 10 | A1 | 2.0% | B1 | 4.0% | C1 | 10.0% |
| Example 24 | 10 | A1 | 2.0% | B1 | 4.0% | C2 | 10.0% |
| Example 25 | 10 | A1 | 2.0% | B1 | 4.0% | C3 | 10.0% |
| Comparative Example 1 | 8 | / | / | / | / | / | / |
| Comparative Example 2 | 8 | A1 | 2.0% | / | / | / | / |

The test process of the lithium-ion secondary battery is described below.

(1) Cyclic Performance Test of Lithium-Ion Secondary Battery Under Normal Temperature and High Voltage Conditions At 25° C., the lithium-ion secondary battery was first charged with a constant current of 1 C to a voltage of 4.35 V, further charged with a constant voltage of 4.35 V until the current was 0.05 C, and then discharged with a constant current of 1 C to a voltage of 3.0 V. Charging/discharging cycle was done in such a way. The discharge capacity at this time was the discharge capacity at the first cycle. The lithium-ion secondary battery was subjected to 200 cycles of charging/discharging test in accordance with the above method, and the discharge capacity at the $200^{th}$ cycle was detected.

Capacity retention ratio (%) of lithium-ion secondary battery after 200 cycles=(discharge capacity at the $200^{th}$ cycle/discharge capacity at the first cycle of lithium-ion secondary battery)×100%.

(2) Cycle Performance Test of Lithium-Ion Secondary Battery Under High Temperature and High Voltage Conditions At 45° C., the lithium-ion secondary battery was first charged with a constant current of 1 C to a voltage of 4.35 V, further charged with a constant voltage of 4.35 V until the current was 0.05 C, and then discharged with a constant current of 1 C to a voltage of 3.0 V. Charging/discharging cycle was done in such a way. The discharge capacity at this time was the discharge capacity at the first cycle. The lithium-ion battery was subjected to 200 cycles of charging/discharging test in accordance with the above method, and the discharge capacity at the $200^{th}$ cycle was detected.

Capacity retention ratio (%) of lithium-ion secondary battery after 200 cycles=(discharge capacity at the $200^{th}$ cycle/discharge capacity at the first cycle of lithium-ion secondary battery)×100%.

(3) Storage Performance Test of Lithium-Ion Secondary Battery Under High Temperature Conditions At 25° C., the lithium-ion secondary battery was charged with a constant current of 0.5 C to a voltage of 4.35 V, and then charged with a constant voltage of 4.35 V until the current was 0.05 C. At this time, the thickness of the lithium-ion secondary battery was tested and recorded as $h_0$. And then, the lithium-ion secondary battery was placed in an incubator at 85° C., and stored for 24 hours. Then the battery was taken out and the thickness of the lithium-ion battery was measured and recorded as $h_1$.

The thickness expansion ratio (%) of the lithium-ion secondary battery after storage at 85° C. for 24 hours=[($h_1$−$h_0$)/$h_0$]×100%.

(4) Low-Temperature Performance Test of Lithium-Ion Secondary Battery

Put the lithium-ion secondary battery into a holding furnace, adjust the temperature of the furnace to 25° C., then charge the lithium-ion secondary battery to a voltage of 4.35V with a constant current of 0.5 C, and then charge it to a current of 0.05 C with a constant voltage of 4.35V. With the above process the lithium-ion secondary battery was fully charged. The fully charged lithium-ion secondary battery was discharged with a constant current of 0.5 C to a voltage of 3.0 V. This process caused the lithium-ion secondary battery to be fully discharged, and the discharge capacity during the full discharging was recorded as $C_0$.

After the temperature of the holding furnace was adjusted to −20° C., it was allowed to stand for 60 minutes. After the temperature in the furnace reached −20° C., the above full charging and full discharging processes were repeated, and the discharge capacity during the full discharging was recorded as $C_1$.

Low temperature capacity retention rate of lithium-ion secondary battery at −20° C. (%)=($C_1/C_0$)×100%.

TABLE 2

Test results of Examples 1-25 and Comparative Examples 1-2

| | Capacity retention ratio (%) after 200 cycles at 25° C./ 4.35 V | Capacity retention ratio (%) after 200 cycles at 45° C./ 4.35 V | Thickness expansion ratio at 85° C. for 24 h | Capacity retention ratio at −20° C. |
|---|---|---|---|---|
| Example 1 | 76% | 59% | 45% | 49.45% |
| Example 2 | 84% | 72% | 15% | 50.14% |
| Example 3 | 92% | 86% | 9% | 53.45% |
| Example 4 | 95% | 90% | 7% | 54.09% |
| Example 5 | 95% | 93% | 5% | 55.89% |
| Example 6 | 96% | 93% | 6% | 56.13% |
| Example 7 | 95% | 92% | 5% | 55.74% |
| Example 8 | 95% | 91% | 6% | 54.93% |
| Example 9 | 93% | 88% | 4% | 53.12% |
| Example 10 | 88% | 83% | 3% | 52.55% |
| Example 11 | 84% | 76% | 1% | 48.65% |
| Example 12 | 75% | 62% | 1% | 42.58% |
| Example 13 | 96% | 93% | 6% | 56.76% |
| Example 14 | 97% | 93% | 5% | 57.03% |
| Example 15 | 98% | 94% | 3% | 56.46% |
| Example 16 | 99% | 97% | 1% | 54.27% |
| Example 17 | 98% | 96% | 3% | 54.56% |
| Example 18 | 99% | 97% | 2% | 53.99% |
| Example 19 | 98% | 94% | 2% | 52.67% |
| Example 20 | 96% | 90% | 1% | 51.45% |
| Example 21 | 94% | 87% | 2% | 50.41% |
| Example 22 | 88% | 82% | 3% | 48.98% |
| Example 23 | 79% | 73% | 1% | 47.09% |
| Example 24 | 82% | 75% | 2% | 46.88% |
| Example 25 | 80% | 72% | 1% | 47.29% |
| Comparative Example 1 | 83% | 75% | 67% | 49.19% |
| Comparative Example 2 | 94% | 91% | 7% | 53.24% |

The addition of the additive A to the electrolyte can effectively improve the gas generation problem of the lithium-ion secondary battery, optimize its storage performance, and further increase the cycle performance of the lithium-ion secondary battery at 25° C. and 45° C., while keeping the low temperature performance. Its functions is mainly to reduce the surface activity of the positive active materials, inhibit the side reactions between the positive active materials and the electrolyte, thereby reducing the gas production, reducing the loss of capacity, and further exhibiting excellent cycle performance and storage performance. At the same time, the additive A can also improve the conductivity of the electrolyte to a certain extent and improve the dynamic performance of the lithium-ion secondary battery, and thus has a certain improvement effect on the low temperature performance of the lithium-ion secondary battery.

On the basis of the additive A, adding an appropriate ratio of the additive B (i.e., lithium sulfonimide salt) may further improves the cycle performance and storage performance of the lithium-ion secondary battery under high temperature and high voltage conditions, and may further reduce the gas production, improve the low temperature and ratio performances, and inhibit the occurrence of low temperature lithium deposition. Its function is that: the additive A can stabilize the surface of the positive electrode and reduce the occurrence of side reactions on the surface of the positive electrode; and the lithium sulfonimide as additive B has the characteristics of high decomposition temperature and no HF during decomposition. That is to say, its heat stability is significantly stronger than LiPF6, which can significantly improve the cycle performance and storage performance of lithium-ion secondary batteries. On the other hand, the additive B can also participate in the formation of SEI film on the negative electrode, so that the formed SEI film can hinder the direct contact of the negative electrode with the electrolyte, thereby effectively reducing the occurrence of side reactions. Finally, with the addition of additive B, the cycle performance and storage performance of the lithium-ion secondary battery can be further improved. In addition, since the dissociation of the additive B is stronger than that of the $LiPF_6$, its conductivity is higher. Therefore, with addition of the additive B, the overall conductivity of the electrolyte is improved, the low temperature and ratio performance are improved, and the low temperature lithium deposition can be significantly suppressed.

Examples 1-12 exhibit the effect of the different ratios of additive A and additive B on the performance of lithium-ion secondary battery. It can be seen from Example 1 that when the additive A is added in a smaller amount and the additive B is added in a larger amount, the cycle performance of the lithium-ion secondary battery is deteriorated, and the gas generation problem may be improved to some extent, but not significantly. The reason is that: when the additive A is added in a smaller amount, the protection effect of the additive A on the positive active materials is not obvious, and when the additive B is added in a larger amount, aluminum foil is strongly corroded under high voltage, thereby causing deterioration of the cycle performance. With the increase of the addition amount of additive A and the decrease of the addition amount of additive B, the synergistic effect of additive A and additive B on the lithium-ion secondary battery is gradually manifested. When additive A is added in 2% and additive B is added in 4%, the cycle performance and storage performance of the lithium-ion secondary battery are also greatly improved compared with the comparative example 2. Example 5, Example 6, and Example 7 provide the optimum ratios of three sulfonimide lithium salts LiFSI, LiTFSI and LiFNFSI to additive A, respectively, which result in great improvement of the cycle performance and storage performance of the lithium-ion secondary battery.

Example 13-25 discovered the effect of additive C (a cyclic carbonate compound containing a carbon-carbon unsaturated bond, a halogen-substituted cyclic carbonate compound) and its addition amount on the lithium-ion secondary batteries on the basis of the optimum amount of the additive A and the additive B in which the additive B 1 (LiFSI), which may produce the optimized cycle and storage performance, was used as a base additive. In Examples 13-25, the cyclic carbonate compound containing a carbon-carbon unsaturated bond and the halogen-substituted cyclic carbonate compound are excellent negative film-forming additives, and may be preferred to other substances in the electrolyte (for example, organic solvents) and form a film on the negative electrode to prevent the destruction of the graphite structure by the organic solvent and the solvated lithium ion. However, if the additive C is added in a larger amount, it will increase the battery impedance. As can be seen from Examples 13-25, when the additive C was added in a smaller amount (less than 1%), the performance of the lithium-ion secondary battery was not significantly improved compared with Example 5. The reason is that the amount of the additive C capable of participating in the film formation is small, and it is difficult to play a significant role; when the additive C is added in a larger amount (greater than 6%), the thickness of the formed SEI film is easily larger, which will lower the migration speed of lithium ions, increase the battery impedance and even lead to lithium deposition. On the other hand, excessive film formation reaction consumes a large amount of lithium ions, so that the irreversible capacity is significantly increased, and the cycle performance of the lithium-ion secondary battery is remarkably lowered. When the additive C is added in an amount of 3%, the cycle performance and storage performance of the lithium-ion secondary battery are optimized. Example 16, Example 17, and Example 18 provide the battery performances when the addition amount of the additive C1 (VC), the additive C2 (VEC), and the additive C3 (FEC) are optimized, respectively. It can be seen that the additive C1 (VC) was superior to the other two additives in terms of cyclic capacity retention ratio and gas production problems.

In addition, the addition of the additive C did not change the conductivity of the electrolyte, so the kinetic performance of the lithium-ion secondary battery was not affected, and the low temperature performance remained substantially unchanged.

It is also known from Examples 1-24 that the conductivity of the electrolyte also affects the performance of the lithium-ion secondary battery. When the conductivity of the electrolyte is smaller, the kinetic performance of the electrolyte is worse, and the low temperature performance of the lithium-ion secondary battery is worse. At the same time, when the conductivity is smaller, the viscosity of the electrolyte is larger, which will also affect the adsorption-film formation effect of the six-membered nitrogen heterocycle containing more than one cyano group and will further affect the film-forming effect of the lithium sulfonimide salt on the surface of the negative electrode. When the conductivity of the electrolyte is larger, the thermal stability of the electrolyte is worse, and the high temperature performance of the lithium-ion secondary battery is worse.

Other Examples

Lithium-ion secondary batteries were further prepared by the method of the above Examples 1 to 25, and the composition of the electrolyte was as shown in Table 3.

TABLE 3

Electrolyte parameters of Examples 26-42

| | Conductivity mS/cm | Additive A Type | Additive A Content | Additive B Type | Additive B Content | Additive C Type | Additive C Content |
|---|---|---|---|---|---|---|---|
| Example 26 | 10 | A2 | 2.0% | B1 | 4.0% | / | / |
| Example 27 | 10 | A3 | 2.0% | B2 | 4.0% | / | / |
| Example 28 | 10 | A4 | 2.0% | B1 | 4.0% | / | / |
| Example 29 | 10 | A5 | 2.0% | B2 | 4.0% | / | / |
| Example 30 | 10 | A6 | 2.0% | B1 | 4.0% | / | / |
| Example 31 | 10 | A7 | 2.0% | B2 | 4.0% | / | / |
| Example 32 | 10 | A8 | 2.0% | B1 | 4.0% | C1 | 3.0% |
| Example 33 | 10 | A9 | 2.0% | B2 | 4.0% | C3 | 3.0% |
| Example 34 | 10 | A10 | 2.0% | B1 | 4.0% | C2 | 3.0% |
| Example 35 | 10 | A11 | 2.0% | B2 | 4.0% | C2 | 3.0% |
| Example 36 | 10 | A12 | 2.0% | B1 | 4.0% | C1 | 3.0% |
| Example 37 | 10 | A13 | 2.0% | B2 | 4.0% | C3 | 3.0% |
| Example 38 | 10 | A14 | 2.0% | B1 | 4.0% | C1 | 3.0% |
| Example 39 | 10 | A15 | 2.0% | B1 | 4.0% | C2 | 3.0% |
| Example 40 | 10 | A16 | 2.0% | B1 | 4.0% | C3 | 3.0% |
| Example 41 | 10 | A17 | 2.0% | B1 | 4.0% | C2 | 3.0% |
| Example 42 | 10 | A18 | 2.0% | B1 | 4.0% | C3 | 3.0% |

TABLE 4

Test results of Examples 26-42

| | Capacity retention ratio (%) after 200 cycles at 25° C./ 4.35 V | Capacity retention ratio (%) after 200 cycles at 45° C./ 4.35 V | Thickness expansion ratio at 85° C. for 24 h | Capacity retention ratio at −20° C. |
|---|---|---|---|---|
| Example 26 | 94% | 92% | 6% | 55.93% |
| Example 27 | 96% | 94% | 7% | 55.74% |
| Example 28 | 95% | 93% | 6% | 56.12% |
| Example 29 | 96% | 93% | 5% | 56.08% |
| Example 30 | 95% | 93% | 5% | 56.74% |
| Example 31 | 96% | 93% | 5% | 56.28% |
| Example 32 | 99% | 98% | 1% | 54.58% |
| Example 33 | 98% | 97% | 3% | 53.69% |

TABLE 4-continued

Test results of Examples 26-42

| | Capacity retention ratio (%) after 200 cycles at 25° C./ 4.35 V | Capacity retention ratio (%) after 200 cycles at 45° C./ 4.35 V | Thickness expansion ratio at 85° C. for 24 h | Capacity retention ratio at −20° C. |
|---|---|---|---|---|
| Example 34 | 99% | 97% | 3% | 53.45% |
| Example 35 | 99% | 96% | 2% | 54.78% |
| Example 36 | 98% | 97% | 1% | 53.90% |
| Example 37 | 99% | 98% | 1% | 55.10% |
| Example 38 | 98% | 96% | 2% | 54.60% |
| Example 39 | 97% | 95% | 3% | 54.11% |
| Example 40 | 99% | 96% | 2% | 53.48% |
| Example 41 | 99% | 97% | 2% | 54.66% |
| Example 42 | 98% | 95% | 2% | 55.55% |

The cycle performance and storage performance as well as low temperature performance of the lithium-ion secondary batteries of Examples 26-42 at high temperature and high voltage were similar to those of Examples 1-25, and are not described herein again.

It will be apparent to those skilled in the art that the present application may be modified and varied in accordance with the above teachings. Accordingly, the present application is not limited to the specific embodiments disclosed and described above, and modifications and variations of the present application are intended to be included within the scope of the claims of the present application. In addition, although some specific terminology is used in this specification, these terms are for convenience of illustration only and are not intended to limit the present application in any way.

The invention claimed is:

1. An electrolyte comprising an additive A and an additive B, wherein the additive A is selected from one or more of the compounds of Formula I-1, Formula I-3;

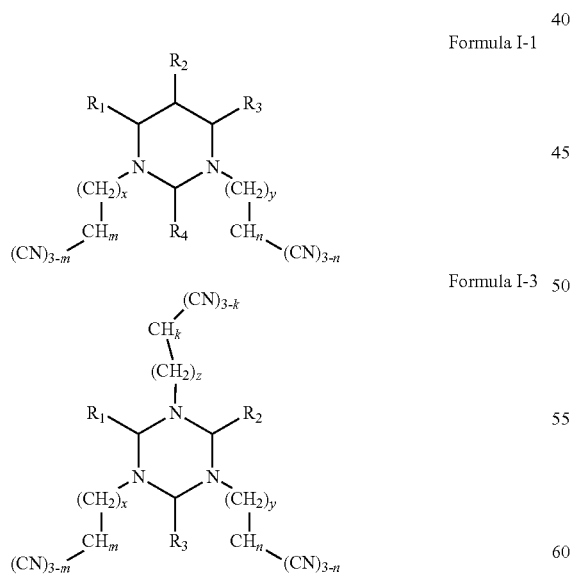

Formula I-1

Formula I-3 in which Formula I-1, Formula I-3: $R_1$, $R_2$, $R_3$, $R_4$ are each independently selected from a hydrogen atom, a halogen atom, a substituted or unsubstituted $C_1$-$C_{12}$ alkyl group, a substituted or unsubstituted $C_1$-$C_{12}$ alkoxy group, a substituted or unsubstituted $C_1$-$C_{12}$ amino group, a substituted or unsubstituted $C_2$-$C_{12}$ alkenyl group, a substituted or unsubstituted $C_2$-$C_{12}$ alkynyl group, a substituted or unsubstituted $C_6$-$C_{26}$ aryl group, and a substituted or unsubstituted $C_2$-$C_{12}$ heterocyclic group, wherein the substituent is selected from one or more of a halogen atom, cyano, a $C_1$-$C_6$ alkyl group, a $C_2$-$C_6$ alkenyl group, and a $C_1$-$C_6$ alkoxy group; x, y, and z are each independently selected from an integer of 0 to 8; m, n, and k are each independently selected from an integer of 0 to 2; and wherein the additive B is selected from a lithium sulfonimide salt represented by formula II, in which formula II, $R_F$ is one of $C_{p1}F_{2p1+1}$ and $F(CF_2CF_2O)_{q1}CF_2CF_2$, $R_f$ is one of $C_{p2}F_{2p2+1}$ and $F(CF_2CF_2O)_{q2}CF_2CF_2$, p1 and p2 are each independently selected from an integer of 0 to 8; and q1 and q2 are each independently selected from an integer of 1 to 6,

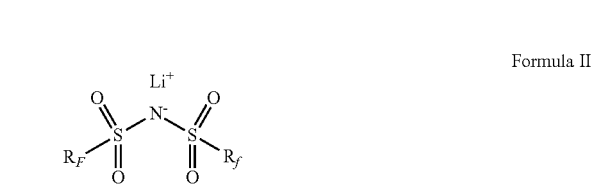

Formula II wherein the additive A is present in an amount of 0.001% to 10% by mass in the electrolyte; the additive B is present in an amount of 0.1% to 10% by mass in the electrolyte; and the electrolyte has a conductivity of 4 mS/cm to 12 mS/cm at 25° C.

2. The electrolyte according to claim 1, wherein the additive A is present in an amount of 0.01% to 6% by mass in the electrolyte and wherein the additive B is present in an amount of 0.5% to 6% by mass in the electrolyte.

3. The electrolyte according to claim 2, wherein the additive A is present in an amount of 0.1% to 3.5% by mass in the electrolyte.

4. The electrolyte according to claim 2, wherein the additive B is present in an amount of 1% to 4% by mass in the electrolyte.

5. The electrolyte of claim 1 wherein the additive A is selected from one or more of the following compounds:

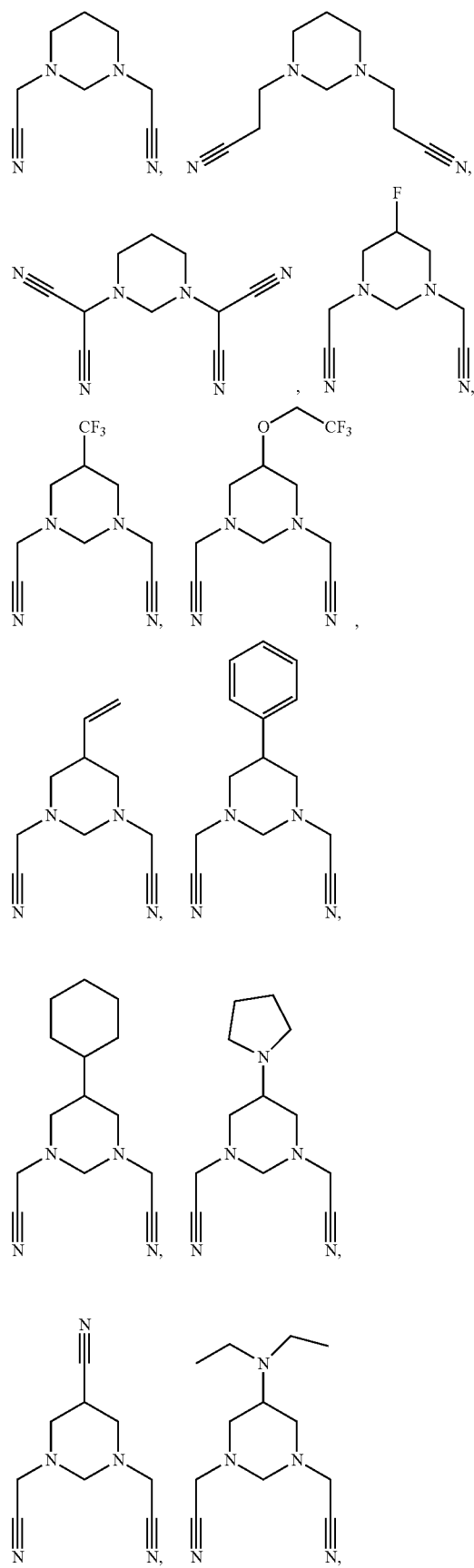
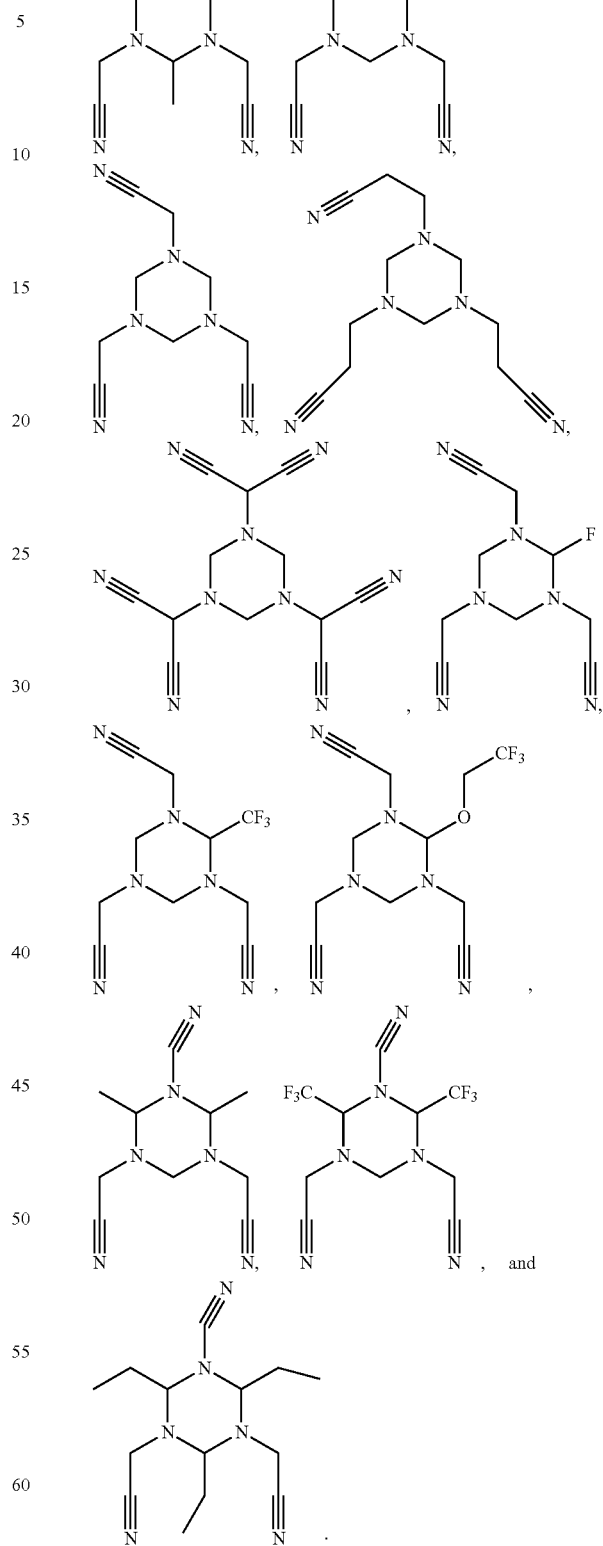
6. The electrolyte according to claim 1, wherein the additive B is selected from one or more of the following compounds:

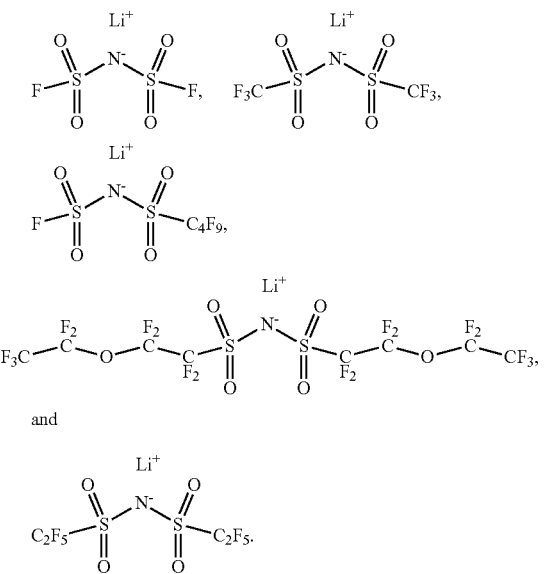

and

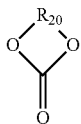

7. The electrolyte according to claim 1, wherein the electrolyte further comprises an additive C and the additive C is selected from one or more of a cyclic carbonate compound containing a carbon-carbon unsaturated bond and a halogen-substituted cyclic carbonate compound.

8. The electrolyte according to claim 7, wherein the cyclic carbonate compound containing a carbon-carbon unsaturated bond is selected from one or more of the compounds represented by Formula III-I, in which Formula III-1, $R_{20}$ is selected from a $C_1$-$C_6$ alkylene group with an alkenyl group or an alkynyl group in its branched chain and a substituted or unsubstituted $C_2$-$C_6$ linear alkenylene group, wherein the substituent is selected from one or more of a halogen atom, a $C_1$-$C_6$ alkyl group and a $C_2$-$C_6$ alkenyl group; and Formula III-1

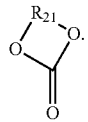

wherein the halogen-substituted cyclic carbonate compound is selected from one or more of the compounds represented by Formula III-2 in which Formula III-2, $R_{21}$ is selected from one or more of a halogen-substituted $C_1$-$C_6$ alkylene group and a halogen-substituted $C_2$-$C_6$ alkenylene group Formula III-2

9. The electrolyte according to claim 7, wherein the additive C is present in an amount of 0.1% to 10% by mass in the electrolyte.

10. The electrolyte according to claim 7, wherein the additive C is present in an amount of 0.5% to 6% by mass in the electrolyte.

11. The electrolyte according to claim 7, wherein the additive C is present in an amount of 1% to 3% by mass in the electrolyte.

12. The electrolyte according to claim 1, wherein the organic solvent comprises a mixture of a cyclic carbonate, a chain carbonate, and a carboxylic acid ester;
the cyclic carbonate is selected from one or more of ethylene carbonate, propylene carbonate, 1,2-butylene carbonate, and 2,3-butylene glycol carbonate; and
the chain carbonate is selected from one or more of ethyl methyl carbonate, methyl propyl carbonate, methyl isopropyl carbonate, methyl butyl carbonate, ethyl propyl carbonate, dimethyl carbonate, diethyl carbonate, dipropyl carbonate, and dibutyl carbonate; and
the carboxylic acid ester is selected from one or more of methyl pivalate, ethyl pivalate, propyl pivalate, butyl pivalate, methyl butyrate, ethyl butyrate, propyl butyrate, butyl butyrate, methyl propionate, ethyl propionate, propyl propionate, butyl propionate, methyl acetate, ethyl acetate, propyl acetate and butyl acetate.

13. The electrolyte according to claim 12, wherein based on the total mass of the organic solvent,
the cyclic carbonate is present in an amount of 15% to 55% by mass;
the chain carbonate is present in an amount of 15% to 74% by mass; and
the carboxylic acid ester is present in an amount of 0.1% to 70% by mass.

14. The electrolyte according to claim 13, wherein based on the total mass of the organic solvent, the cyclic carbonate is present in an amount of 25% to 50% by mass.

15. The electrolyte according to claim 13, wherein based on the total mass of the organic solvent, the chain carbonate is present in an amount of 25% to 70% by mass.

16. The electrolyte according to claim 13, wherein based on the total mass of the organic solvent, the carboxylic acid ester is present in an amount of 5% to 50% by mass.

17. An electrochemical device comprising a positive electrode plate, a negative electrode plate, a separator disposed between the positive electrode plate and the negative electrode plate, and an electrolyte, wherein the electrolyte is the electrolyte according to claim 1.

* * * * *